United States Patent
Annunziata et al.

(10) Patent No.: US 10,325,316 B2
(45) Date of Patent: Jun. 18, 2019

(54) METHOD AND APPARATUS OF DISPLAYING MARKET DEPTH AND OTHER INFORMATION ON A MOBILE PHONE, HANDHELD DEVICE OR COMPUTER SYSTEM

(75) Inventors: Vincent P. Annunziata, Greenwich, CT (US); David Ehrlich, York, PA (US); Paul Summermatter, Portsmouth, NH (US); Eric M. Hermanson, Sterling Heights, MI (US); John Rowland, Hopewell Junction, NY (US)

(73) Assignee: Trade Capture, OTC Corp., Stamford, CT (US)

( * ) Notice: Subject to any disclaimer, the term of this patent is extended or adjusted under 35 U.S.C. 154(b) by 1819 days.

(21) Appl. No.: 12/893,690

(22) Filed: Sep. 29, 2010

(65) Prior Publication Data

US 2011/0112952 A1 May 12, 2011

Related U.S. Application Data

(60) Provisional application No. 61/248,354, filed on Oct. 2, 2009.

(51) Int. Cl.
*G06Q 40/04* (2012.01)

(52) U.S. Cl.
CPC .................................. *G06Q 40/04* (2013.01)

(58) Field of Classification Search
CPC ......... G06Q 40/04; G06Q 40/06; G06Q 30/08

(Continued)

(56) References Cited

U.S. PATENT DOCUMENTS

| 5,297,032 A | 3/1994 | Trojan et al. |
| 5,873,071 A | 2/1999 | Ferstenberg et al. |

(Continued)

FOREIGN PATENT DOCUMENTS

| EP | 1327940 A1 | 7/2003 |
| GB | 2358768 | 12/2001 |
| WO | 2006/064348 | 6/2006 |

OTHER PUBLICATIONS

Canadian Office Action dated Dec. 7, 2015 in corresponding Canadian Patent Application No. 2,716,146.

(Continued)

*Primary Examiner* — Bennett M Sigmond
*Assistant Examiner* — Michael D Cranford
(74) *Attorney, Agent, or Firm* — DLA Piper LLP (US)

(57) ABSTRACT

An exemplary system according to the present disclosure comprises a server system (comprising one or more computing devices) that is in communication with one or more financial exchange systems and one or more data source computer devices (e.g., news sources). Also in communication with the server system are one or more mobile communication devices. The server system comprises a memory and a processor executing software that enables the server system to receive live market data and information from one or more of the financial exchange systems and the data source computer devices; aggregate and filter the data and information; according to one or more pre-set user preferences and/or one or more user-initiated commands; and transmit the aggregated/filtered data and information to one or more mobile communication devices via one or more live data feeds. The mobile communication device displays aggregated/filtered information in a single, interactive GUI.

51 Claims, 12 Drawing Sheets

(58) Field of Classification Search
USPC .......................................................... 705/37
See application file for complete search history.

(56) References Cited

U.S. PATENT DOCUMENTS

| | | | |
|---|---|---|---|
| 6,029,146 A | 2/2000 | Hawkins et al. | |
| 6,134,535 A | 10/2000 | Belzberg | |
| 6,272,474 B1 | 8/2001 | Garcia | |
| 6,278,982 B1 | 8/2001 | Korhammer et al. | |
| 6,317,728 B1 | 11/2001 | Kane | |
| 6,493,683 B1 | 12/2002 | David et al. | |
| 6,625,583 B1 | 9/2003 | Silverman et al. | |
| 6,938,011 B1 | 8/2005 | Kemp, II et al. | |
| 6,985,883 B1 | 1/2006 | Togher et al. | |
| 7,010,508 B1 | 3/2006 | Lockwood | |
| 7,107,240 B1 | 9/2006 | Silverman et al. | |
| 7,177,833 B1 | 2/2007 | Marynowski et al. | |
| 7,181,424 B1 | 2/2007 | Ketchum et al. | |
| 7,184,984 B2 | 2/2007 | Glodjo et al. | |
| 7,194,468 B1 | 3/2007 | Bacila et al. | |
| 7,212,994 B2 | 5/2007 | Howell et al. | |
| 7,251,629 B1 | 7/2007 | Marynowski et al. | |
| 7,389,268 B1 | 6/2008 | Kemp, II et al. | |
| 7,424,303 B2 | 9/2008 | Al-Sarawi | |
| 7,424,452 B2 | 9/2008 | Feilbogen et al. | |
| 7,426,491 B1 | 9/2008 | Singer et al. | |
| 7,516,196 B1 | 4/2009 | Madan et al. | |
| 7,533,052 B2 | 5/2009 | Tilfors et al. | |
| 7,610,239 B1 | 10/2009 | Silverman et al. | |
| 7,617,149 B2 | 11/2009 | Rosenthal et al. | |
| 7,624,064 B2 | 11/2009 | Rosenthal et al. | |
| 7,624,066 B2 | 11/2009 | Janowski et al. | |
| 7,627,517 B2 | 12/2009 | Badenhorst et al. | |
| 2001/0034688 A1 | 10/2001 | Annunziata | |
| 2001/0049651 A1 | 12/2001 | Selleck | |
| 2002/0032632 A1 | 3/2002 | Sernet | |
| 2002/0069156 A1 | 6/2002 | Adam et al. | |
| 2002/0091615 A1 | 7/2002 | Salvani | |
| 2002/0188555 A1 | 12/2002 | Lawrence | |
| 2003/0018569 A1 | 1/2003 | Eisenthal et al. | |
| 2005/0149426 A1* | 7/2005 | Jokisch et al. | 705/37 |
| 2005/0160024 A1 | 7/2005 | Soderborg et al. | |
| 2006/0069635 A1* | 3/2006 | Ram et al. | 705/37 |
| 2006/0085310 A1 | 4/2006 | Mylet et al. | |
| 2006/0184444 A1 | 8/2006 | McConaughy et al. | |
| 2006/0253371 A1 | 11/2006 | Rutt et al. | |
| 2006/0282369 A1 | 12/2006 | White | |
| 2007/0005481 A1 | 1/2007 | Kedia et al. | |
| 2007/0083458 A1 | 4/2007 | Rosenthal et al. | |
| 2007/0088658 A1 | 4/2007 | Rosenthal et al. | |
| 2007/0118456 A1 | 5/2007 | Glinberg et al. | |
| 2007/0168275 A1 | 7/2007 | Busby et al. | |
| 2007/0179875 A1 | 8/2007 | Chiu | |
| 2007/0208654 A1 | 9/2007 | Stearns | |
| 2008/0059353 A1 | 3/2008 | Ronk | |
| 2008/0097892 A1 | 4/2008 | Yohai-Giochais | |
| 2008/0162378 A1 | 4/2008 | Levine et al. | |
| 2008/0109379 A1 | 5/2008 | Cofnas et al. | |
| 2009/0171832 A1 | 7/2009 | Busby | |
| 2009/0189760 A1 | 7/2009 | Preston et al. | |
| 2010/0010937 A1 | 1/2010 | Rosenthal | |

OTHER PUBLICATIONS

The Canadian Official Action dated Aug. 1, 2014 in corresponding Canadian Patent Application No. 2,716,146.
Canadian Office Action dated Feb. 23, 2017 in corresponding Canadian Patent Application No. 2,821,460.
Canadian Office Action dated May 7, 2018 in corresponding Canadian Patent Application No. 2,716,146.

* cited by examiner

METHOD AND APPARATUS OF DISPLAYING MARKET DEPTH AND OTHER INFORMATION ON A MOBILE PHONE, HANDHELD DEVICE OR COMPUTER SYSTEM

TECHNICAL FIELD

This disclosure relates generally to providing financial services, and in particular, to methods and apparatus for providing real-time market data, including full depth of market information, and trading functionality to users via mobile communication devices and/or computer systems.

BACKGROUND

The commodity futures trading industry has migrated from a primarily voice-brokered and floor-transacted trading environment to one that is predominantly electronic in nature. As a result of the migration to electronically focused trading, trading industries (and particularly the commodities industry) have experienced massive growth in volume and volatility, and expressed a need for fast and ubiquitous access to market data as soon as it becomes available. During this same period, the electronic, computing and mobile industries have seen equally significant growth in hand-held mobile devices and the like. For example, the power and capabilities of current hand-held mobile devices rival those of desktop computing systems from a few years ago. Despite the rapid growth in the capabilities of mobile devices, such as the iPOD®, iPhone®, Blackberry®, etc., the commodity futures trading industry, for example, has not yet offered an adequate solution to the problems associated with mobile electronic trading.

While some marginally effective electronic trading solutions exist for the mobile platform, they all suffer from a number of deficiencies. First, many of the trading solutions do not offer real time data streams and up to date quotes as is needed for effective trading. The data that is provided is typically delayed, or it is provided on periodic intervals, such as on a refresh basis. Likewise, the data that is provided is often times truncated so that even the delayed data does not present a complete picture of the trading behavior of a particular issue.

Even for those few systems that do attempt to provide real time data, they are limited to providing the last trade price and other similar market statistics (often on a refresh basis). These systems, however, are unable to (and as a result, do not) provide an extremely important class of data, known as market depth, which is critical for electronic commodity futures trading. Market depth is a price based aggregation of the best current bids and offers for any futures time period, typically ten layers deep, on each side (i.e., the bid and ask). Due to the extreme volatility and physically settled nature of certain financial instruments, and to the large financial positions at stake, commodity futures market participants (e.g., traders) require and demand that market depth information be provided in real-time.

The prior art systems, particularly in the context of mobile devices, suffer from deficiencies in retrieving and/or displaying such forms of critical market data on a real time basis because of the complex nature of the data and the inherent limitations of the systems/devices themselves. For example, typical mobile devices do not have the connectivity (e.g. limited data rate, etc.), screen display space, or functional capabilities needed by traders to effectively and efficiently receive and display real-time data, and execute transaction commands in real-time.

These and other limitations of mobile devices require that information be retrieved, processed, filtered, and displayed in a manner that is less meaningful, precise, and useful than is needed to effectively engage in real-time commodities trading.

In view of the deficiencies of conventional systems and devices, including mobile devices, there is a need for an inventive solution that enables users to effectively and actively trade from a mobile handheld device. In particular, there is a need for a mobile, handheld device that enables users to receive, view, display, sort, manage, transmit, and interact with real-time data and information in a meaningful and precise manner, so as to allow the user to effectively and actively trade in real-time and on-the-go.

SUMMARY

The present disclosure relates generally to systems, apparatus, and methods that enables users to receive, view, display, sort, manage, transmit, and interact with real-time data and information in a meaningful and precise manner, so as to allow the user to effectively and actively trade in real-time and on-the-go.

An exemplary system according to the present disclosure comprises a server system (comprising one or more computing devices) that is in communication with one or more financial exchange systems and one or more data source computer devices (e.g., news sources). Also in communication with the server system are one or more mobile communication devices.

The server system comprises a memory storing pre-set user preferences and a processor executing software that enables the server system to receive live market data and information from one or more of the financial exchange systems and the data source computer devices. The information received in the server system is then aggregated and filtered according to one or more pre-set user preferences and/or one or more user-initiated commands. The aggregated/filtered data and information are then transmitted one or more of the mobile communication devices via one or more live data feeds.

A mobile communication device in accordance with the present disclosure utilizes a transmitter to transmit data, messages, and commands; and a receiver configured to receive data transmissions and information, including via one or more live data feeds. Also included in the mobile communication device are one or more input devices for receiving user inputs. Optionally, the mobile communication device may include a touch-screen, whereby a user may provide user inputs via the touch-screen.

Also included in the exemplary mobile communication device is a processor executing software that enables the communication device to generate and display multiple interactive graphical user interfaces (GUI's). A first of the interactive GUI's is configured to simultaneously display live market data and information received via at least one live data feed. Notably, the live market data and information is provided from multiple financial exchange systems and other data sources, and then aggregated, filtered, and displayed to the user on a simple, single interactive GUI. This interactive GUI includes a dynamic market window displaying user-selected multimedia content, live market statistics, and at least one execution icon that when selected, invokes the communicating device to generate and transmit a transaction execution command.

Displayed in the dynamic market window may be a full depth of market, a listing of last traded prices, live news, and live price charts. A user may easily switch between the various displays in the dynamic market window, while other live data (e.g., market statistics) remain displayed on the interactive GUI.

DETAILED DESCRIPTION

Figure 1:
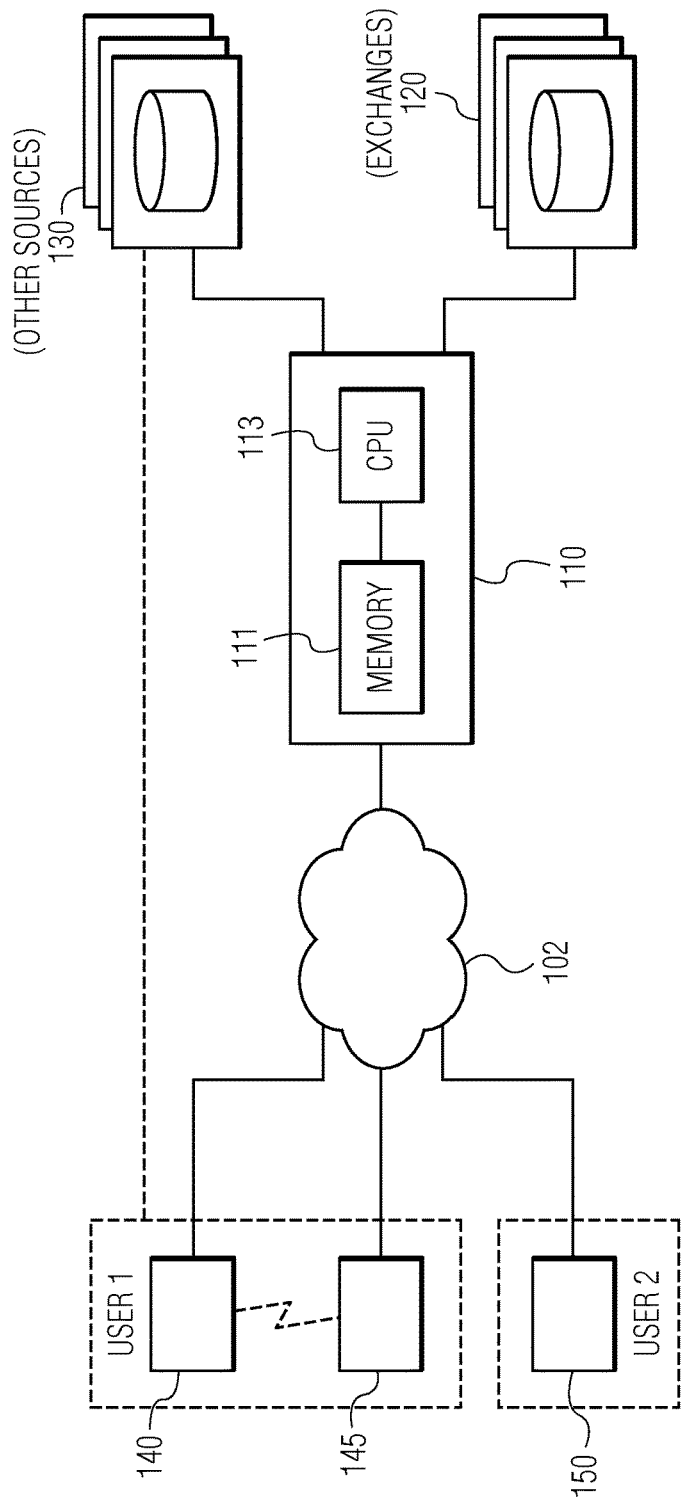
FIG. 1 illustrates an exemplary system in accordance with the present disclosure.

The present disclosure relates generally to systems, apparatus, and methods that enables users to receive, view, display, sort, manage, transmit, and interact with real-time data and information in a meaningful and precise manner, so as to allow the user to effectively and actively trade in real-time and on-the-go.

An exemplary system according to the present disclosure defines a system architecture that comprises several major components:

A) A central computer system (e.g., server system) that is responsible for communicating with one or more financial exchanges and other data/information resources. The server facilitates the aggregation of data and information provided by multiple exchanges and information sources, filtration of the aggregated data according to user-selected preferences, presentation of the filtered data to client communication devices, and the execution of trading transactions in response to execution comments provided by the client devices;

B) One or more communication devices in communication with the server system;

C) A highly optimized communication scheme that compresses the size of the data stream between the client devices and server;

D) An intelligent algorithm residing on the communication devices which subscribes and un-subscribes to and from data feeds on an as-needed basis to minimize the amount of data flow between client communication devices and server, and to minimize the amount of data managed on the communication devices (e.g., when a trader switches views between various commodity/trading period combinations, etc.); and E) An interactive user interface incorporated into said client communication devices configured to provide certain novel functionality, while at the same time enabling users/traders to view, on a single screen, real-time data and information aggregated from multiple exchanges and/or other sources. Such real-time data and information may include, for example:

1.) Market Depth—an aggregated view that displays a listing of bids and offers, side by side, in a manner that enables users to scroll up and down the listing. Importantly, the market depth is created from bids and offers gathered from one or more financial exchange entities. In addition, users may simultaneously view a best bid/best offer and other critical market statistics such as the high/low, settle, last trade price, total volume, change (for the day), open interest, status, contract name, trading period name, etc. associated with a particular commodity in a particular trading period.

2.) Trading Periods—the interactive user interface may optionally enable users to view Market Depth (and/or other real-time information) while also being able to switch immediately between various contract trading periods of market depth using simple commands and/or icons that when selected, invoke the client communication devices to display a scrollable header of trading periods which are displayed simultaneously along with the items listed above.

3.) Placing Bids/Offers—the interactive user interface may optionally enable users to view Market Depth (and/or other real-time information) while simultaneously enabling users to place an actual bid or offer for a given commodity (or other issue, depending on the nature of the trade).

Notably, the interactive user interface is preferably configured to provide all the information that a user/trader needs to make trading decisions, while filtering out information that is not essential or desired. In addition, the information and/or executable icons are preferably arranged so as to minimize trading errors, for example.

Other features of the interactive user interface may include, without limit:

A.) displaying a live, scrollable list of last-trade prices in an aggregated view, while simultaneously displaying a best-bid, a best-offer, and/or other market statistics;

B.) displaying a live, scrollable chart of prices in an aggregated view, while simultaneously displaying a best-bid, a best-offer, and/or other market statistics;

C.) the ability to immediately switch between various commodities and/or trading periods for which the live information being displayed pertains;

D.) the ability to place a bid or offer while simultaneously displaying the live, scrollable list of last-traded prices or chart of prices; and E.) on-screen functions that are activated with a touch or click.

In an exemplary implementation, a client communication device configured in accordance with the present disclosure may run a software application that prompts a user to enter some form of authentication information (e.g., User Name and Password) before granting access to the various features and options disclosed herein. This communication device is in communication with a central server system configured to receive live market data and information from up to multiple financial exchange systems and/or other sources, aggregate and filter the live data and information, and transmit the live data and information to the communication device. Upon receiving the live data and information, the communication device is configured to display the aggregated and filtered information in a single interactive graphical user interface (GUI), thereby providing the user with sufficient information to effectively engage in real-time, mobile trading.

After the user is authenticated (i.e., User Name and Password are verified), based on that user's security and permissions profile (e.g., which may be set up and/or stored in the communication device itself and/or on a central server system in communication with the communication device), the communication device may optionally determine a global navigation position of the device. Based on location of the communication device, certain other pre-set preferences (in the form of use-permissions, for example) may be invoked. These use-permissions may be set by an administrator, a risk manager, the user, and any other entity, and such use-permissions may be used to control the user's ability to place orders (including types of orders that may be placed), trading limits according to geographic location of the device, commodity/trading period trading restrictions, etc. As an added security measure, the user may be required to enter one or more security pin code(s) prior to permitting the user to perform certain functions, such as placing orders, reviewing open orders or positions, etc. Optionally, these use-permissions may automatically be synched to another of the user's multiple devices, at login, such that any changes, updates, settings, transactions, etc. executed on one device will automatically be reflected on the user's other device(s).

Figure 4:
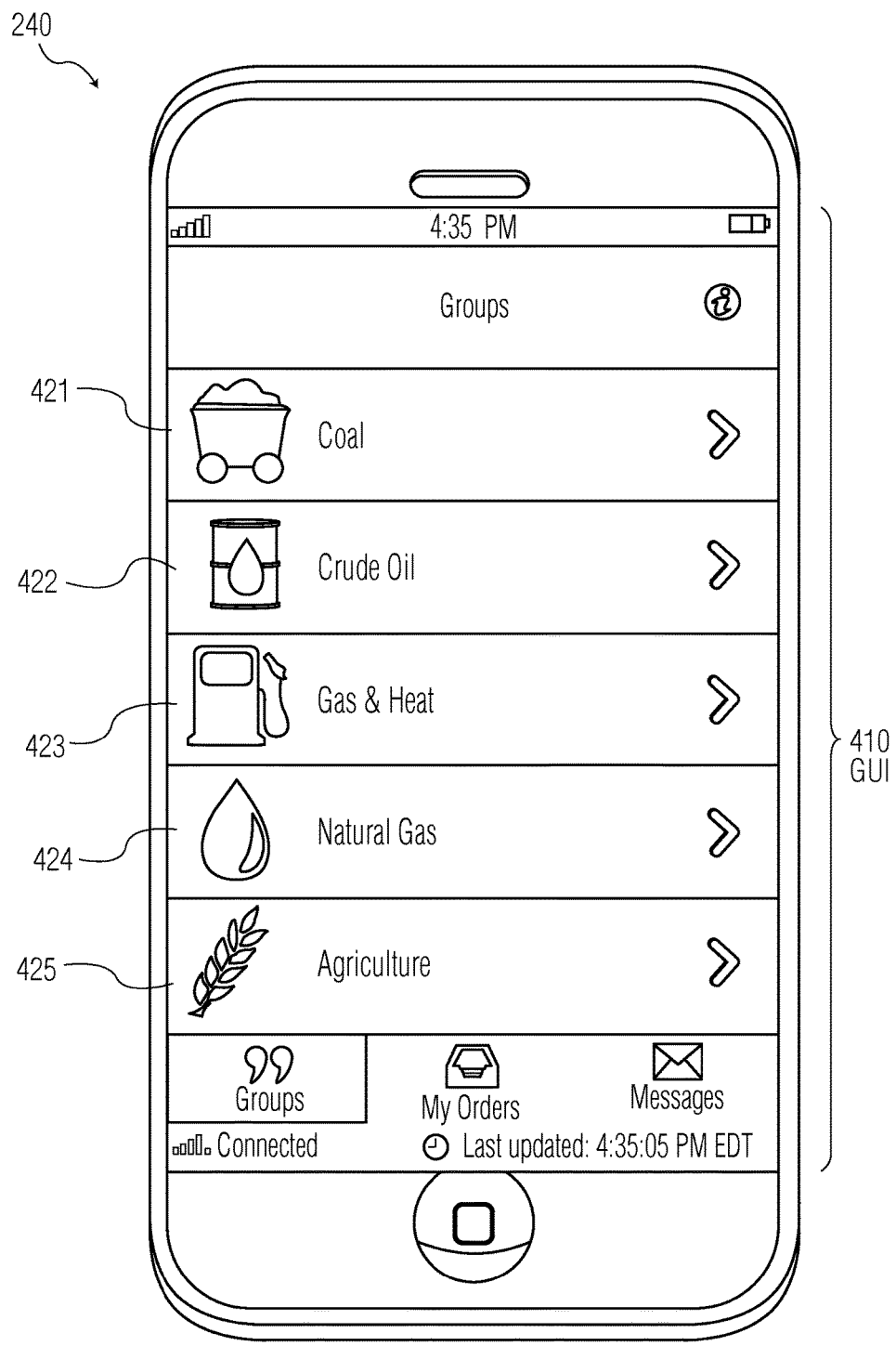
FIG. 4 illustrates another exemplary GUI in accordance with the present disclosure.

After the initial authentication, and after all initial use-permissions are determined and established, the user may be presented with an interactive graphic user interface (GUI) that includes a list of commodity groups from which to choose in order to begin viewing markets for trading (e.g., trading-group GUI 410 shown in FIG. 4). These commodity groups may include a combination of user defined market profile groups and/or exchange provided groups. Optionally, the user defined market profile groups may also be automatically synched to another of the user's devices, such as a desktop computer, at login.

These market profile groups may be stored on a central server(s), and upon activating either device, the market profile groups are transmitted to that device. This automatic syncing option saves the user a tremendous amount of time and enables the user to immediately begin trading on any of his devices with the same settings and set-up established on any of the user's other devices. For example, changes made on a user's desktop computer will automatically be reflected on the user's mobile telephone upon logging into the mobile telephone, and vice versa.

Optionally, this trading-group GUI may include a scrolling mechanism, which enables the user to access a longer list of groups on the limited-sized display screen. In addition, the user may select (e.g., by clicking) a specific commodity group (e.g., Crude Oil) in order to generate an interactive market summary display of the pre-defined list of commodities and associated trading periods for the selected commodity group (e.g., market summary GUI 510 shown in FIG. 5). This trading-group GUI 410 may also include an information (i) icon, which allows the user to easily edit and save their market profiles. Notably, an information (i) icon may be incorporated into any GUI described herein, said (i) icon providing configuration information and/or enabling a user to edit and save settings, configurations, updates, profiles, etc.

After selecting one of the groups from the commodity group list, an interactive market summary GUI (e.g., market summary GUI 510 shown in FIG. 5) that includes a market summary window (which represents either the market profile created by the user or a group of commodity/trading periods predefined by an exchange) may be displayed. Using an optional scrolling mechanism, the user may easily scroll up and down to view the various commodity/trading period combinations from which to choose. Also displayed in this market summary window may be live price updates measured in milliseconds. Optional icons included in the market summary window enable the user to switch between various views of the live market statistics associated with the various commodity/trading period combinations. For example, the user may select a "bid" icon to view live bids associated with each commodity/trading period combination. Other market statistics such as offers, high price, low price, change-on-day, volume, and open interest may also be selected.

Upon selecting a particular commodity/trading period combination, a detailed view of the selected commodity/trading period combination is generated and displayed in another interactive GUI (e.g., market-detail GUI 210 shown in FIG. 2). Notably, this interactive market-detail GUI may be reached by selecting a specific commodity/trading period combination from the market summary GUI, as described above. Alternatively, this market-detail GUI may be launched automatically upon activating the user's communication device (in response to pre-set user preference, for example).

Preferably, this market-detail GUI simultaneously displays (on a single display screen) live market data and information aggregated from one or more financial exchange systems and/or other sources. The central server system may perform this aggregation of data and information and provide the aggregated data and information to the user's communication device via, for example, one or more live data feeds. The live market data and information may be displayed in the form of a dynamic market window (displaying user-selected multimedia content), live market statistics, and one or more execution icons that when selected, invokes the communicating device to generate and transmit a transaction execution command to a server system, for example.

Figure 2A:
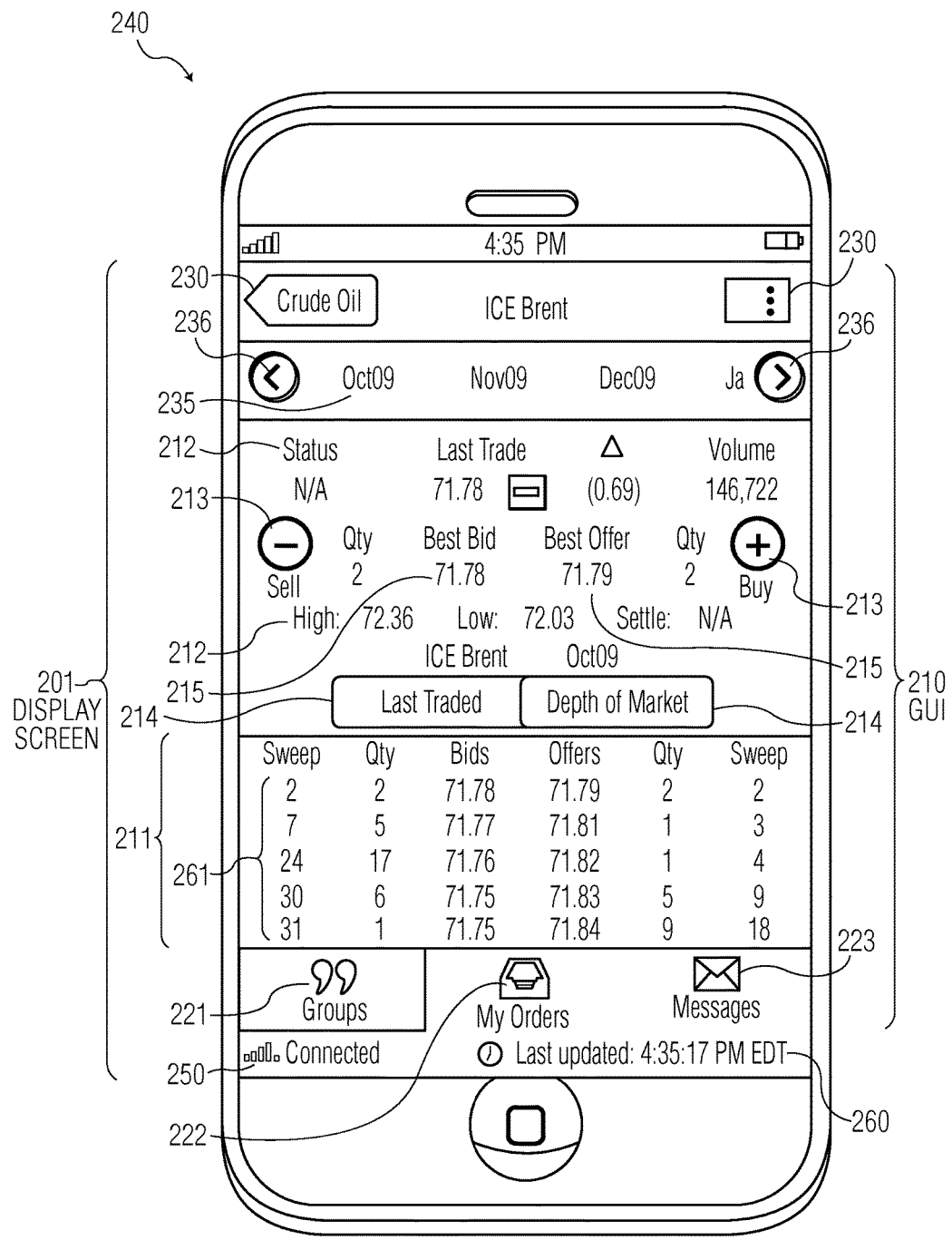
FIGS. 2A-2C illustrates an exemplary communication device that includes an interactive graphical user interface (GUI) in accordance with the present disclosure.
Figure 2B:
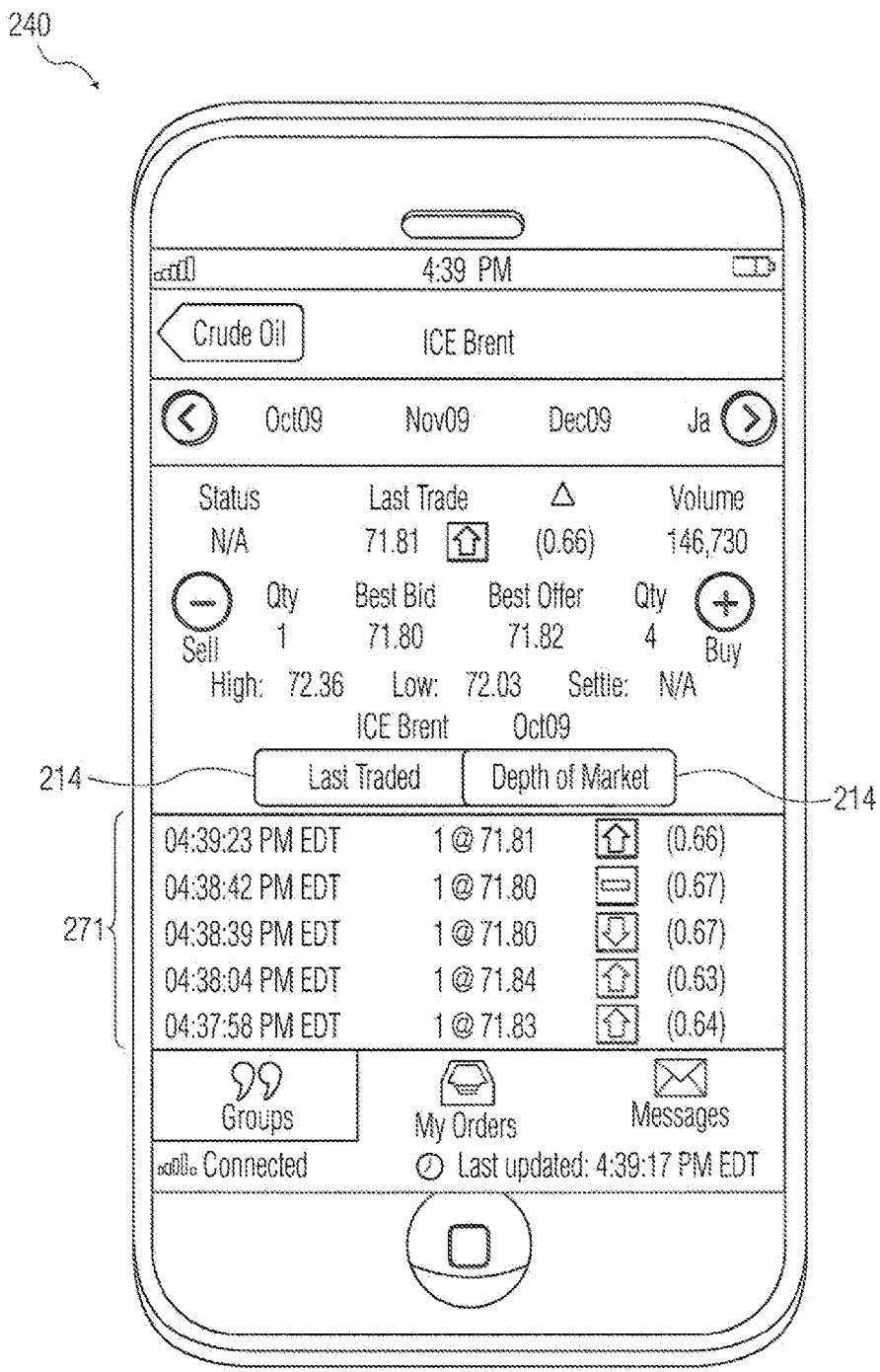
Figure 2C:
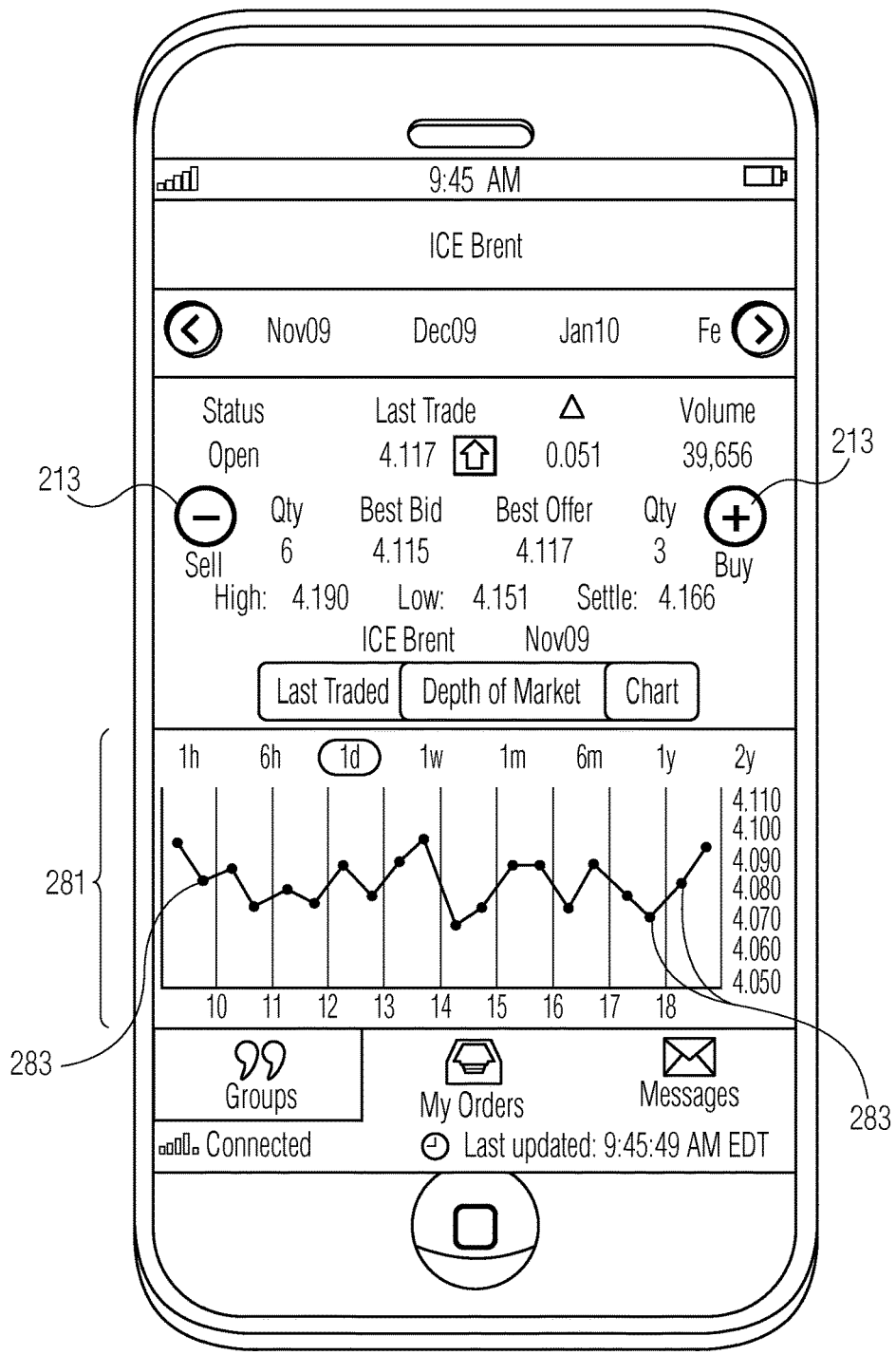

Optionally, the interactive market-detail GUI may also include one or more market window icons, each of which invokes the communication device to display, in the dynamic market window, one of a live full market depth display comprising a listing of bids and offers (as shown in FIG. 2A), a listing of last-traded prices (as shown in FIG. 2B), live news, or live price charts (as shown in FIG. 2C) associated with a user-selected commodity/trading period combination.

Once in the market-detail GUI, the user may use a novel scrolling mechanism to scroll amongst any number of commodities and trading periods. The user may change the selected commodity/trading period combination displayed by selecting a different commodity and/or trading period using the novel scrolling mechanism. Once a new commodity/trading period combination is selected, the communication device will automatically update the live market data and information being displayed to correspond with the newly selected commodity/trading period combination.

The one or more execution icons included on the interactive market-detail GUI may include a sell icon and a buy icon. Selecting either of the sell or buy icons invokes the communication device to generate and display an interactive order execution GUI (e.g., interactive order execution GUI 310 shown in FIG. 3) that displays live market data while a user enters buy or sell order data.

Included in this interactive order execution GUI are optional interactive slide bar(s) and/or arrows, each for adjusting one or more order data details prior to entering a buy or sell order. For implementations that include both slide bars and arrows, the user may manipulate the order data details using both slide bars and arrows. Once the order price and quantity are as desired, a user may place an order by selecting an optional "place bid" icon included in this order execution GUI. Alternatively, the user may cancel the order by simply selecting an optional "cancel" icon. As a security option, the order execution GUI may be configured to require entry of a security pin code before processing a buy or sell order execution command.

In addition to placing orders from the order execution GUI described above, a user may place orders directly from the market-detail GUI. Indeed, a noted above, the user may select to view live price charts in the GUI's dynamic market window. Since this price chart is interactive, a user may select a price point on the price chart, and then select one of the order execution icons (i.e., the buy or sell icon).

Figure 7:
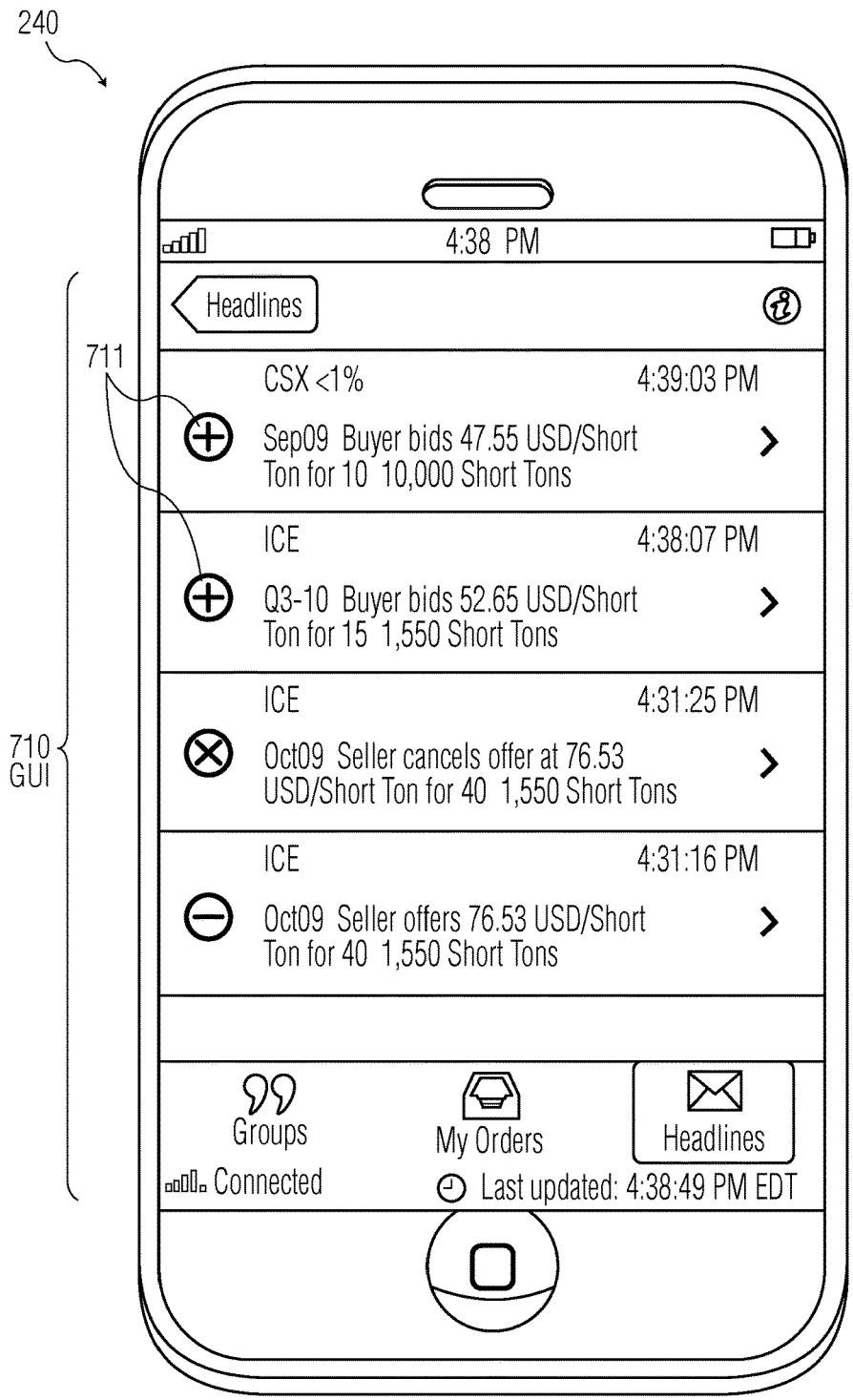
FIG. 7 illustrates another exemplary GUI in accordance with the present disclosure.

Headlines from multiple exchanges that include information relating to new bids/offers, modifications to bids/offers, cancellations to bids/offers, and executed trades may be accessed via an interactive headlines GUI (e.g., headlines GUI 710 shown in FIG. 7). Optionally, this interactive headlines GUI enables the user to view the headline detail, and execute an order directly from this headlines GUI by selecting an order execution command (e.g., buy or sell) associated with a particular headline.

Over the counter (OTC) orders may be viewed in another interactive OTC GUI (e.g., OTC GUI 810 shown in FIG. 8). This OTC GUI may include real order(s), implied order(s), firm order(s), indicative order(s), order-cancel-order (OCO) order(s), linked order(s), and/or order(s) that have been placed on hold grouped according to a commodity/trading period combination, along with real-time futures prices, for example. Notably, the displayed OTC GUI orders are aggregated from various brokers and/or financial exchange systems, and displayed in a single GUI display. In addition to displaying orders, this OTC GUI may display order origin information, broker/exchange contact information, and call icons for calling the broker/exchange posting any particular OTC order.

As an option, if the connection strength of the communications link between the user's communication device and the central server system falls below a predetermined threshold, an alert will be automatically provided to the user, along with an option to place any open orders on hold until the connection is restored. The communication device will then attempt to restore the connection to the central server system.

Figure 6:
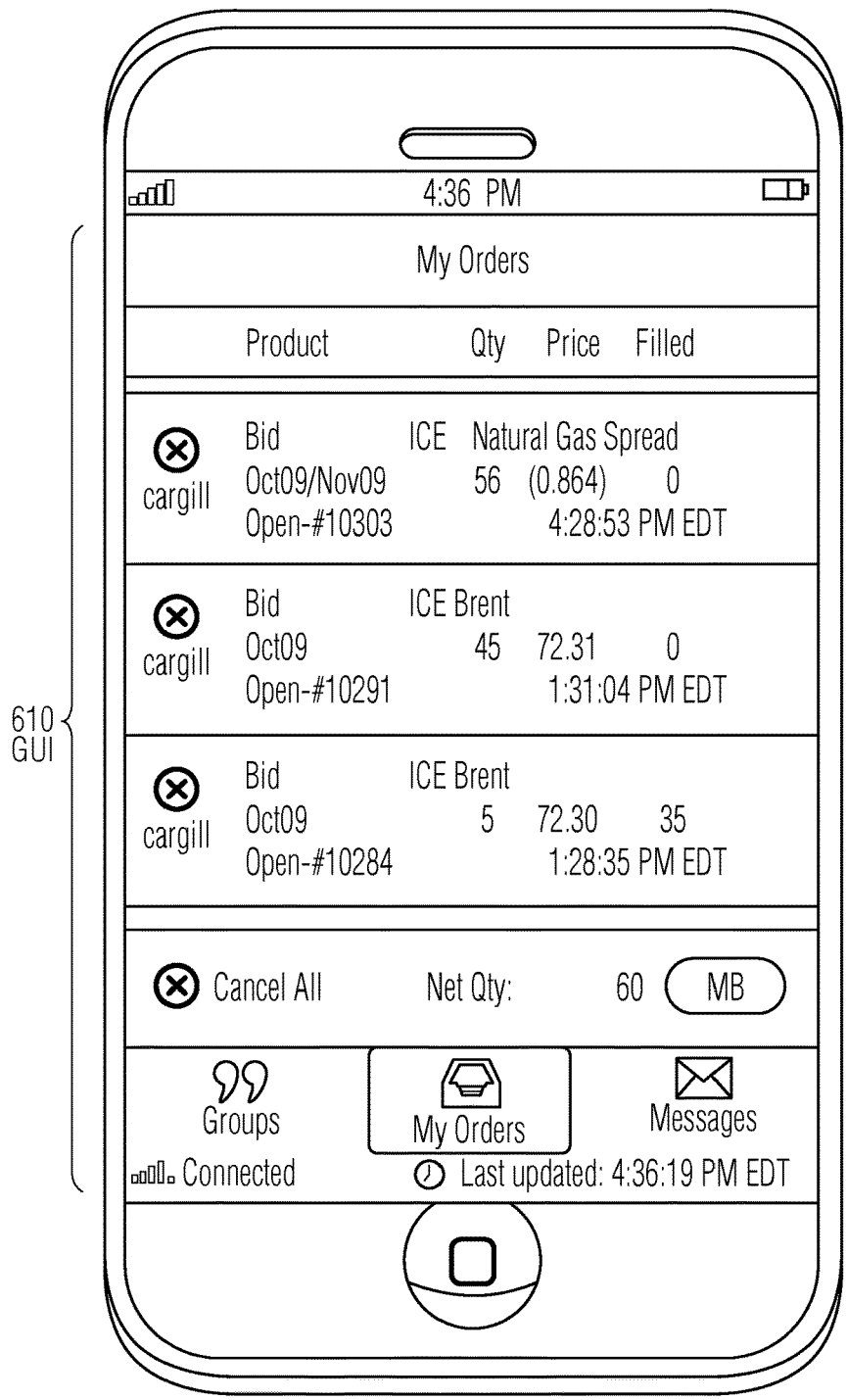
FIG. 6 illustrates another exemplary GUI in accordance with the present disclosure.

As a security measure, and to prevent 'rogue' trading activities, a risk manager (or other administrative or authoritative entity) may monitor the trading activities of one or more users via an interactive orders GUI (e.g., orders GUI 610 shown in FIG. 6). This interactive order GUI displays order data corresponding to one or more users, to one or more selected trading accounts, or according to any other filter criteria. The information displayed on this GUI may include data and information relating to open orders, cancelled orders, partially filled orders, and fully filled orders, together with real-time position and profit/loss information.

As an option, the risk manager may establish one or more pre-set user preferences that imposes trading rules and limits according to the geographic location of the user's communication device. In addition, the risk manager may establish one or more pre-set user preferences that prevents users from executing transactions that violate pre-set trading rules or limits, and that cause the communication device to generate real-time warnings/alerts if any particular user attempts to execute a transaction that violates, or comes within a predetermined range of violating, pre-set trading rules and limits.

Turning now to FIG. 1, an exemplary system 100 in accordance with the present disclosure is shown. The exemplary system 100 includes a server system 110 comprising one or more computing devices in communication with one or more financial exchange systems 120 (each comprising one or more computing devices providing live (and/or historic) market data (e.g., live bid data, live offer data, and other transaction/exchange-related data)). The financial exchange systems 120 may include, for example, financial exchange platforms, clearing house platforms, banking systems, and/or other systems and platforms providing commodities and financial-related transaction information and data Optionally, the server system 110 may also be in communication with one or more other sources (e.g., data source computer devices) of live (and/or historic) data and information 130 (e.g., news sources providing live news, the Internet providing text, video, and/or images, etc.). Notably, these other sources may provide information to the server system 110, and/or directly to the one or more communication devices 140, 145, 150 (described below) that are in communication with the server system 110.

Also in communication with the server system 110, via a wired or wireless communications link 102, are one or more communication devices 140, 145, 150. These communication devices may include any of a mobile telephone, a server, personal computer (PC), a multimedia device, a mobile hand-held device, a personal data assistant (PDA), a combined computing/communication device, and a mobile tablet computer. Optionally, more than one of the communication devices 140, 145 may be associated with one particular user (e.g., User 1). For example, a first communication device 140 associated with a user may comprise a personal computer, a server or the like that is utilized in one location (e.g., a home or office), while second device 145 associated with said user may comprise a mobile device, such as a mobile telephone or hand-held mobile tablet computer, that is utilized in one or more other locations. In such an embodiment, the server system 110 may optionally be configured to link the user's (User 1) devices 140, 145 (in response to a pre-set user preference, for example) such that changes, updates, settings, limits, transactions, etc. executed on one of said devices (e.g., 140) are automatically reflected (i.e., synched) on said other of said communication devices (e.g., 145), and vice versa. These synching pre-set preferences may be stored on the server system 110 and/or on any of the communication devices 140, 145. Upon activating either device 140, 145, any desired changes, updates, settings, limits, transactions, etc. may automatically be transmitted to the other device 140, 145. As will be appreciated by those of skill in the art, this automatic synching feature saves a significant amount of time insofar as a user will not have to manually update more than one device. Instead, the user will be able to immediately begin trading on any of his devices with the same settings and pre-set preferences established on any of the user's other devices.

Included in the server system 110 is a memory 111 storing exchange data, user-preference data, transaction data, and/or other data and information received from the financial exchange systems 120 and/or other data and information sources 130. The user-preference data may include, for example, trading rules, trading limits, geographic trading rules and limits, and linking preferences for synching one or more communication devices 140, 150 together as noted above.

Also included in the server system 110 is a processor (CPU) executing software that enables the server system 110 to perform the various functions discussed herein, including (without limit) receiving live (and historic) data and information from the exchange systems 120 and from the other information sources 130, aggregating the data and information, filtering the data and information according to pre-set user preferences, and transmitting the filtered data and information, in a compressed form, to the communication devices 140, 145, 150 for display on one or more interactive user interfaces.

In one embodiment, the data and information provided to and/or transmitted by the server system 110 may be transmitted via live data feeds according to pre-set preferences and/or in response to command(s) received from the communication devices 140, 145, 150. This data and information may relate to one or more commodities (e.g., coal, crude oil, gas and heat, natural gas, agriculture, metals, power, etc.), and take form of live market data and information (e.g., live bids, live offers, a listing of last-traded prices, live news, etc.), live multi-media content, live price charts, and live market statistics, for example. The live market statistics may include one or more of a high price, a low price, a best bid price, a best offer price, a bid quantity for a given price, an offer quantity for a given price, a settlement price, a last traded price, a transaction status indicator, a total traded volume, a daily price change, a commodity name, a trading period, and an open interest associated with a particular commodity/trading period combination.

In order to optimize communications between the server system 110 and the communication devices 140, 145, 150, a highly optimized communication scheme that compresses the size of the data stream(s) between the server system 110 and the communication devices 140, 145, 150 may be utilized.

The server system 110 may further comprise software that when executed, enables the server system 110 to receive and process commands from the communication devices 140, 145, 150. Such commands may include, for example, transaction execution commands, buy order commands, and sell order commands, which invoke the server system 110 to execute transactions and/or post orders to the financial exchange systems 120. Other commands may include data and information filter commands, commands that invoke the server system 110 to subscribe or unsubscribe to one or more of live data feeds, and commands for setting, canceling, and changing one or more pre-set user preferences.

Turning now to FIGS. 2-8, an exemplary embodiment of at least one communication device 240 configured to operate within the exemplary system 100 described above is shown. For purposes of this exemplary embodiment, it is assumed that the communication device 240 comprises a mobile communication device, such as a mobile telephone. As noted above, however, other communication devices (e.g., PC, PDA, mobile tablet computer, etc.) may be utilized without departing from this disclosure.

Since communication device 240 is a mobile telephone, it comprises a transmitter (not shown) configured to transmit data, messages, and commands; and a receiver (not shown) configured to receive data transmissions and information, including via one or more live data feeds. Optionally, the transmitter and receiver may be configured for wired and/or wireless communications.

The exemplary communication device 240 also comprises one or more input devices for receiving user inputs, a display screen 201, and a processor (not shown) executing software that causes the communication device 240 to generate and display a first interactive graphical user interface (GUI) 210 (the "market-detail GUI") on the display screen 201. In one embodiment, the display screen 201 comprises a touch-screen configured to process and interpret a user's contact with the display screen 201 as user inputs.

The interactive market-detail GUI 210 may be activated by navigating through one or more other GUI's described herein, in which case a specific commodity/trading period combination has been selected using said other GUI's. Alternatively, the communication device 240 may be configured (via, pre-set user preferences, for example) to automatically launch this GUI 210, with a pre-selected commodity/trading period combination, upon activation of the device 240.

In this exemplary embodiment, the selected commodity/trading period combination is "ICE Brent" (which represents the commodity crude oil contract)/"OCT09" (which represents the trading period, or listed delivery date of the crude oil contract, i.e., October 2009). As further discussed below, a user may easily change the commodity/trading period combination by selecting a different commodity (via selection icon 230) or a different trading period (via selection icon 235).

Optionally, the full name of the commodity/trading period combination (e.g., ICE Brent Oct09) may be persistently displayed on the market-detail GUI at all times. In this case, the commodity/trading period combination name is displayed below the "High/Low/Settle" prices in middle portion of the GUI 210, although it may be displayed in any desired location.

Once this market-detail GUI 210 is activated and displayed, a user may change the commodity/trading period combination within this GUI 210 by selecting a commodity selection icon 230 which corresponds to a different commodity, and/or a trading period icon 235 which corresponds to a different trading period. To facilitate the selection of the commodity/trading period icons 230, 235, an optional scrolling icon 236 may be included in the GUI 210. This scrolling icon 236 provides functionality that is completely novel and unique in the art, as it enables users to quickly scroll between any number of trading periods within a single display screen, whether on a small communication device (such as a mobile telephone) or on a large device (such as a desktop PC), to highlight and then select the desired trading period.

Notably, this exemplary GUI 210 includes a single scrolling icon 236 that pertains to the trading period icons 235, however, it should be understood that a similar scrolling icon may be incorporated into this GUI 210 (or into any other GUI described herein) to correspond to the commodity selection icons (or to any other selection icons, whether on this GUI or on any other GUI described herein). For example, as an added option, the commodity name (e.g., ICE Brent) may be configured to slide from one commodity to the next based on the list of commodities defined in the "parent" commodity group. In other words, just as the trading period selection icons 235 may be scrolled laterally, the commodity name may also be configured for lateral scrolling.

Upon selecting a desired commodity selection icon 230 and/or trading period icon 235, a filter mechanism (not shown) is invoked to limit the data and information displayed on the GUI 210 to that which pertains to the selected commodity/trading period combination. This filter mechanism, when activated, may also be configured to invoke the communication device 240 to subscribe or unsubscribe to one or more of the live data feeds which, as noted above, provide live market data and information from one or more different sources.

In practice, the market-detail GUI 210 may be utilized for real-time trading of commodities (including futures, financials, and physical over-the-counter (OTC) contracts, etc., whether settled bilaterally and/or cleared). As a result, this GUI 210 is preferably configured to simultaneously display live market data and information received from a server system (such as the server system 110 described with respect to FIG. 1, for example) via, one or more live data feeds. Notably, the live market data and information displayed via this GUI 210 (and/or via any other GUI described herein) may be aggregated from up to multiple financial exchange systems and/or other sources, and then displayed on a single GUI. As noted above, this aggregation may be accomplished by a server system prior to reaching the communication device 240.

The live market data and information may be displayed in the form of a dynamic market window 211 displaying user-selected multimedia content, live market statistics 212, and one or more execution icons 213 that when selected, invokes the communicating device 240 to generate and transmit a transaction execution command to a server system, for example. For implementations involving small mobile communication devices 240 (e.g., mobile telephones), the particular layout of this GUI 210 takes into account the user's experience and attempts to prevent inadvertent key-strokes or "fat finger" mistakes by adequately spacing selectable icons apart from one another. In addition, the exemplary layout of GUI 210 enables the user to make rapid real-time trading decisions and quickly place orders for trading. Moreover, the particular information displayed via this GUI 210, as will be further discussed below, instantly provides the user with all of the relevant data and information needed to trade with respect to a specific commodity/trading period combination.

Optionally, the interactive market-detail GUI 210 may also comprise one or more market window icons 214, each of which invokes the communication device 240 to display, in the dynamic market window 211, one of a live full market depth display comprising a listing of bids and offers 261 (as shown in FIG. 2A), a listing of last-traded prices 271 (as shown in FIG. 2B), live news, or live price charts 281 (as shown in FIG. 2C) associated with a user-selected commodity/trading period combination. Uniquely, this interactive market-detail GUI 210 enables trading directly from a live price chart 281. For example, the live price chart 281 may include one or more live price points 283 defining a graph. By selecting one of said live price points 283, and then selecting one of said execution icons 213 (i.e., a buy or sell icon), the user may invokes the communication device 240 to generate and transmit a transaction execution command for an order at the selected price point.

The dynamic market display window 211 may include a scrolling mechanism (not shown) for scrolling (vertically or laterally) across any of the contents displayed in said display window 211. As a result of including such a scrolling mechanism, any amount of data and information may be accessed and viewed on a single GUI, regardless of the size of the display area.

The live market statistics 212 included in the interactive market-detail GUI 210 may include one or more of a high price, a low price, a bid quantity for a given price, an offer quantity for a given price, a settlement price, a last traded price, a status indicator, a total traded volume, a daily price change, a commodity name, a trading period, and an open interest associated with the user-selected commodity/trading period combination. In addition to these live market statistics 212, the interactive market-detail GUI 210 may further comprise a best bid price display and/or a best offer price display 215 associated with the user-selected commodity/trading period combination.

Figure 3:
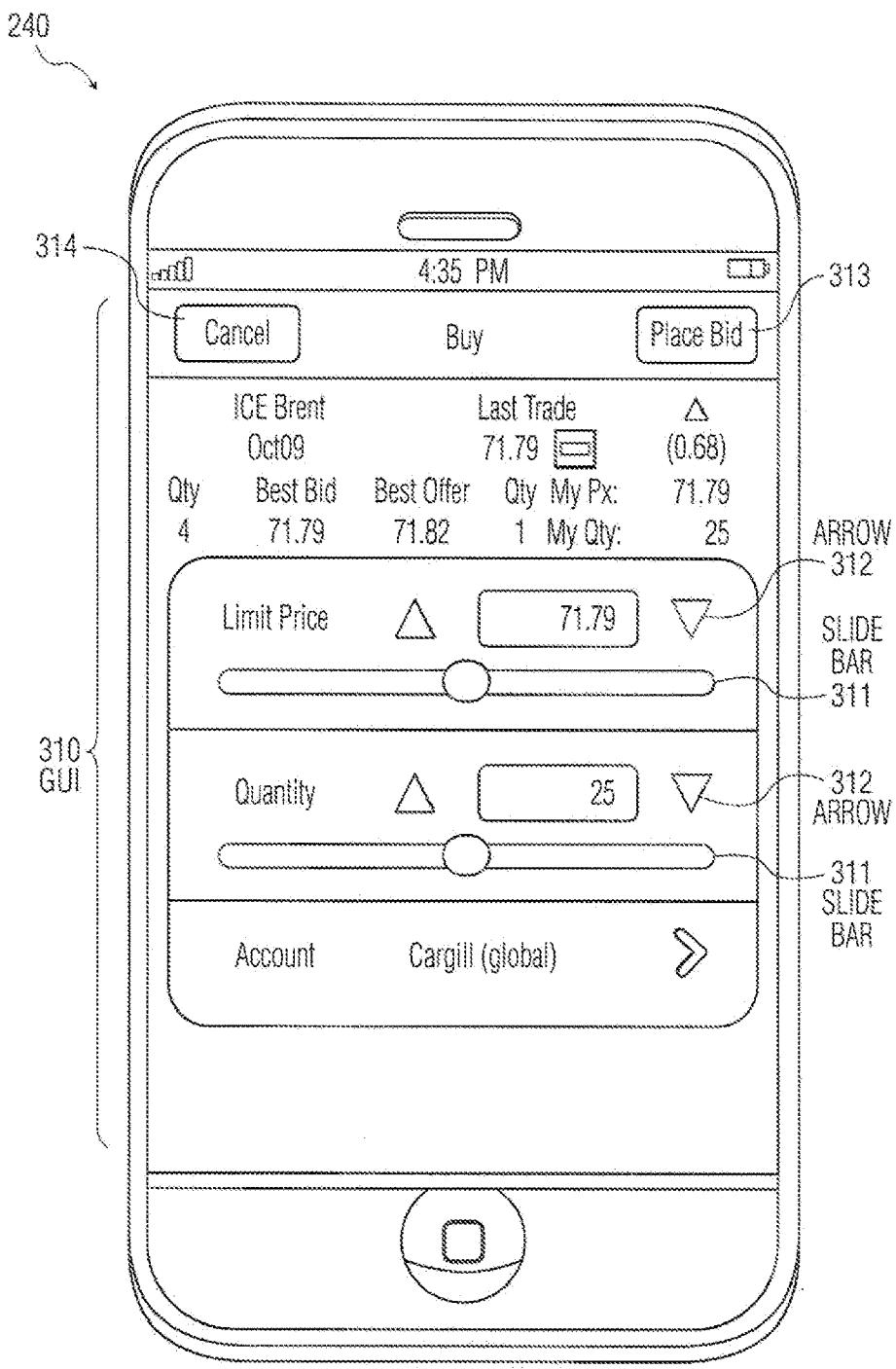
FIG. 3 illustrates another exemplary GUI in accordance with the present disclosure.

The one or more execution icons 213 included on the interactive market-detail GUI 210 may include a sell icon and a buy icon. Selecting either of the sell or buy icons 213 invokes the communication device 240 to generate and display an interactive order execution GUI that displays live market data while a user enters buy or sell order data. An exemplary interactive order execution GUI 310 is shown in FIG. 3. Optionally, a top portion of this order execution GUI 310 displays in clear text whether a buy or a sell order is being placed. In this illustration the word "BUY" is shown at said top portion, indicating that a buy order is being placed. This GUI 310 also optionally displays the commodity/trading period combination (e.g., "ICE Brent Oct09") and other market information (e.g., Last Trade, Change on the day, Best Bid and Quantity and Best Offer and Quantity, etc.) associated with the order being placed.

Included in this interactive order execution GUI 310 are optional interactive slide bar(s) 311 and/or arrows 312, each for adjusting one or more order data details prior to entering a buy or sell order. For implementations that include both slide bars 311 and arrows 312, the user may manipulate the order data details using both slide bars 311 and arrows 312. Once the order price and quantity are as desired, a user may place an order by selecting the "place bid" icon 313. Alternatively, the user may cancel the order by simply selecting the "cancel" icon 314. As a security option, the order execution GUI may be configured to require entry of a security pin code (not shown) before processing a buy or sell order execution command.

Optionally, the interactive market-detail GUI 210 may be laid out in three main portions including a top portion, a middle portion and a bottom portion. The top portion of the interactive market-detail GUI 210 may include a first sub-portion that displays commodity selection icons 230, each of which corresponds to a different commodity, and a second sub-portion adjacent to the first sub-portion A1 that displays trading period icons 235. This top portion may also include the optional scrolling icon 236 described above, which is configured to switch between the one or more trading period selection icons 235. As noted above, when a user selects at least one commodity selection icon 230 and at least one trading period selection icon 235, the communication device 240 invokes the filter to limit the data and information provided via the live data feeds to that which pertains to the selected commodity/trading period combination.

The middle portion of the interactive market-detail GUI 210 may be configured to display the live market statistics 212 and execution icon(s) 213 (e.g., one sell icon and one buy icon). Preferably, the sell and buy icons 213 are spaced apart from each other on opposed sides of the middle portion. Lastly, the bottom portion of the interactive market-detail GUI 210 may be used to display the dynamic market display window 211.

Figure 5:
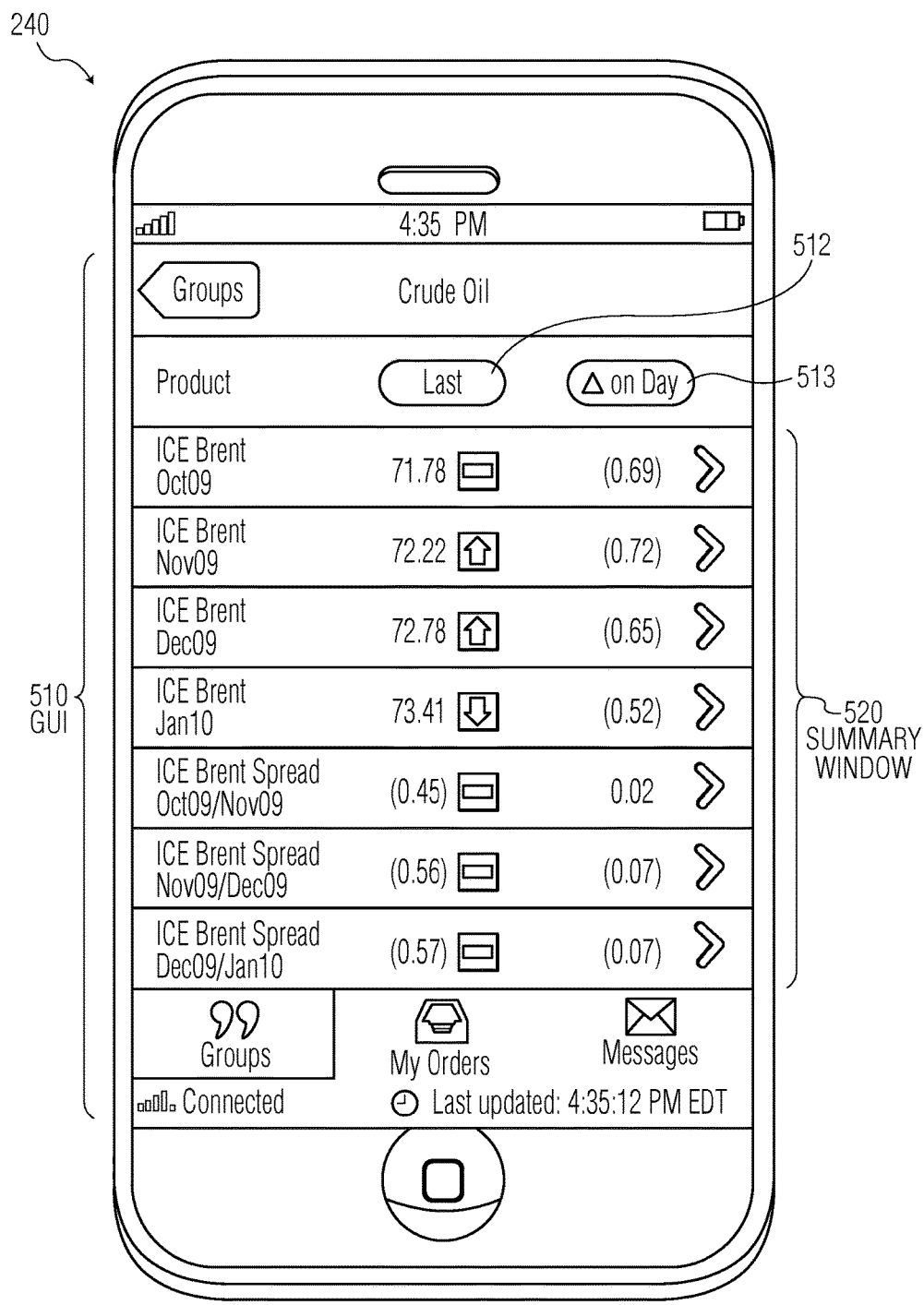
FIG. 5 illustrates another exemplary GUI in accordance with the present disclosure.

In an alternate embodiment, the interactive market-detail GUI 210 may further comprise one or more menu icons 220, each of which corresponds to a different interactive GUI. Optionally, these menu icons 220 may be persistently visible on the display screen 201 regardless of which interactive GUI is being presented to the user. Selection of a first of these menu icons 221 may invoke the communication device 240 to generate and display an interactive trading-group GUI 410, as illustrated in FIG. 4. This exemplary grading-group GUI 410 displays one or more trading group icons 421-425 corresponding to one or more trading groups. Each of these trading group icons 421-425 may be configured to invoke the communication device 240 to generate and display an interactive market summary GUI 510, as shown in FIG. 5, associated with a corresponding one of the trading groups when selected. These trading groups may include, for example, commodity trading groups and/or financial trading groups. The commodity trading groups may correspond, for example, to coal, crude oil, gas & heat, natural gas, agriculture, metals, power, etc. The financial trading groups (not shown) may correspond, for example, to swaps, OTC options, indices, etc.

The interactive market summary GUI 510 may be configured to display a market summary window 520 in which a user-defined market profile, and/or a list of one or more commodity/trading period combinations 520, together with at least one live market statistic associated with each commodity/trading period combination, may be displayed. Using an optional scrolling mechanism, the user may easily scroll up and down to view the various commodity/trading period combinations from which to choose.

Optionally, this interactive market summary GUI 510 may include one or more market statistic icons 512, 513 that when selected, invokes the communication device 240 to change at least one of the live market statistics being displayed. These icons 512, 513 enable the user to quickly switch between various views of the live market statistics. For example, the user may select a "Last" icon 512 to view real-time last-traded prices associated with each listed commodity/trading period combination. Other market statistics, such as offers (not shown), high price (not shown), low price (not shown), change on day 513, volume, open interest, profit/loss, etc., may also be displayed with a corresponding icon.

In certain implementations, the communication device 240 may be configured to automatically rotate information being displayed based on the orientation of the communication device 240 itself. For example, if the communication device 240 is being held upright, information will be displayed in a portrait orientation. However, if the device 240 is being held in a landscape orientation, the information displayed will automatically rotate and be displayed in a landscape orientation. In such an implementation, the user may rotate the communication device 240 so that the screen has a landscape orientation, in which case the more information (e.g., additional market statistic columns) may be displayed in the market summary window 520.

Notably, the rotation feature discussed above with respect to market summary GUI 510 may be implemented with respect to any communication device and/or GUI described herein. As a result, a user may rotate any communication device to a landscape orientation in order to view additional information provided by the various GUI's described herein.

Returning to FIG. 2, other persistently visible menu icons 220 may include, for example, an orders icon 222, a messages icon 223, a news icon (not shown), a headlines icon (not shown), an alerts icon (not shown), a charts icon (not shown) a positions icon (not shown), and any number of other icons that may be used to launch desired interactive GUI's. Selection of the orders icon 222 may invoke the communication device 240 to generate and display an interactive Orders GUI 610, as shown in FIG. 6, which displays order data corresponding to one or more users, to one or more selected trading accounts, or according to any other filter criteria. The information displayed on this GUI 610 may include data and information relating to open orders, cancelled orders, partially filled orders, and fully filled orders, together with real-time position and profit/loss information. Notably, this particular GUI 610, in conjunction with certain other features discussed below, may be utilized by risk managers (or any other authorized administrative entity) to monitor various user(s) and/or trading account(s), and to prohibit trading functions for any user (or group of users), thereby preventing 'rogue' trading from mobile communication devices, such as a mobile telephone.

As an option, the exemplary communication device 240 according to the present disclosure may include memory for storing pre-set user preferences and/or other user and security related information. These user preferences may be set by the user, or they may be set by an administrator, such as a risk manager. In addition to being stored on the communication device 240, these pre-set user preferences may be stored on a server system. The communication device 240 may also include an optional global positioning device (not shown) configured to identify and/or communicate the geographic location of the communication device 240 to the server system and/or to one or more other devices, including to a risk manager's device.

As a security measure, the risk manager may establish one or more pre-set user preferences that imposes trading rules and limits according to the geographic location of the communication device 240. Thus, when the communication device 240 is in one location (e.g., a user's office), trading limits may be set to one level, whereas when the communication device 240 is in another location (e.g., a user's home), trading limits may be set to a different (lower or higher) level. Further, the global positioning feature could be used to notify a risk manager when a user has left their particular office, at which point modified trading limits may be imposed.

In addition, the risk manager may establish one or more pre-set user preferences that cause the communication device 240 to generate and display real-time warnings/alerts if any particular user (or group of users) attempts to execute a transaction that violates, or comes within a predetermined range of violating, pre-set trading rules and limits. These warnings/alerts may be displayed on the user's device 240 and/or on a device being utilized by the risk administrator. In addition to generating a warning, pre-set user preference may be used to prevent the user(s) from executing any transactions that violate any pre-set trading rules or limits.

Optionally, the risk manager may utilize GUI 610 to monitor, in real-time, order, position, and/or profit/loss information and activity relating to any particular user (or group of users) to ensure compliance with trading rules or limits. If any such user approaches and/or surpasses a trading limit, the risk manager may manually disable trading functions.

In the case where the communication device 240 is linked to another communication device (e.g., a personal computer), a pre-set user preference may be used to impose different trading rules and limits on each of the linked devices.

As an added security measure, the communication device 240 may include one or more pre-set user preferences that require the user to enter a security pin code prior to placing any order or reviewing open orders or positions. This would prevent unauthorized users from accessing order information and/or from placing orders.

The headlines icon may be configured to invokes the communication device 240 to generate and display an interactive headline GUI 710, as shown in FIG. 7, 710 which displays headline information relating to new bids and offers, modifications to bids and offers, cancellations of bids and offers, and executed/concluded trading transaction information. Headline information may also relate to news and alerts, and provide information such as user name, company name and account detail information. This headline information may be aggregated from multiple sources (e.g., multiple financial exchange systems), and it may be displayed according to a user profile/pre-set preference. For example, one particular user profile may require that additional (or fewer) details, such as company name for example, be shown in this GUI 710. The headline GUI 710 may also comprise a filter option, which may be used to filter the information (e.g., via bid, offer, trades, etc.) provided via this GUI 710.

Optionally, the headline information may be displayed in a manner that resembles a listing of instant message windows, which is also a novel and unique feature. In such an embodiment, a user may select a particular headline for a more detailed view. As an added option, the headline GUI 710 may further provide at least one execution icon 711 (that may be accessed directly from a headline detailed view) to invoke the communication device 240 to generate and transmit a transaction execution command to a server system in communication with the communication device 240.

As with other information displayed via any GUI described herein, the information provided via this headline GUI 710 may be aggregated from multiple sources, such as multiple financial exchange systems.

In yet another embodiment, the interactive market-detail GUI 210 of FIG. 2 (or any other GUI described herein) may further comprise a strength-of-signal indicator 250 showing the strength of a communication link between the communication device 240 and a source of the live data feeds (e.g., server system). Optionally, the communication device 240 may be configured to generate and display an alert message if the strength of the communications link falls below a predetermined threshold, or if the communications link is lost for any reason. This alert message may include a hold icon that when selected, invokes the communication device 240 to place open orders on hold until the strength of said communication link rises above said predetermined threshold. Once the communications link may be reestablished, the computing device 240 may be configured to automatically and intelligently reconnect with the data source(s).

Optionally, the interactive market-detail GUI 210 (or any other GUI described herein) may further include a time stamp display 260 showing a time-of-day at which any of the displayed data or information (e.g., prices) was last modified or updated.

Figure 8A:
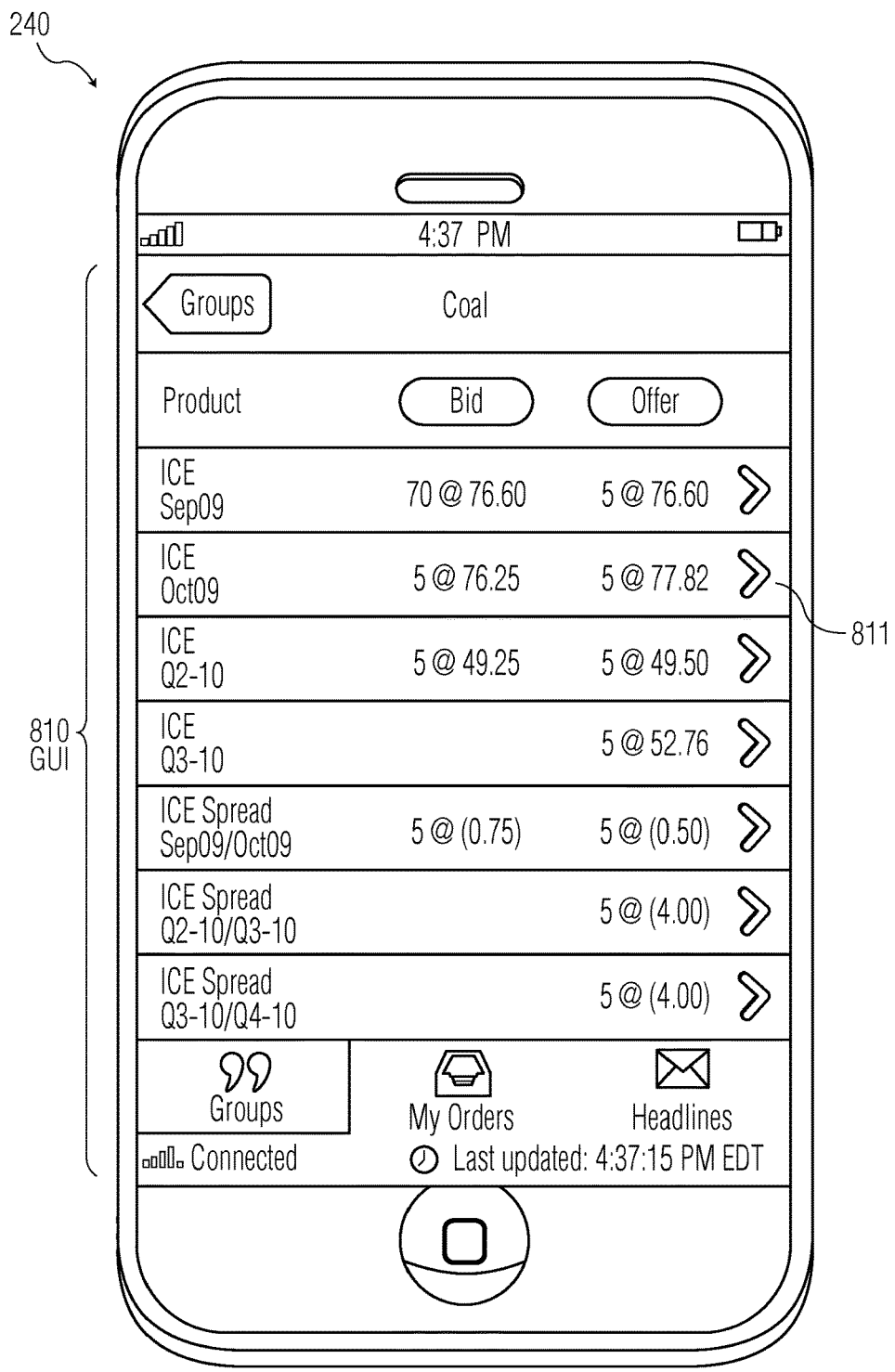
FIGS. 8A-8B illustrate two additional exemplary GUIs in accordance with the present disclosure.

In another embodiment, the mobile communication device 240 may further include software that when executed generates an interactive over-the-counter (OTC) GUI 810, as shown in FIG. 8A. This OTC GUI 810 preferably simultaneously displays one or more OTC orders that may include real order(s), implied order(s), firm order(s), indicative order(s), order-cancel-order (OCO) order(s), linked order(s), and/or order(s) that have been placed on hold grouped according to a commodity/trading period combination. As understood by those of skill in the art, implied orders are those that are not necessarily provided by an exchange, but instead must be calculated. According to the present disclosure, a full depth of market of implied orders may be calculated via the server system (100) described above, and then transmitted to a communication device 240.

For purposes of this disclosure, OCO orders refer to those orders that are related insofar as fulfillment of one automatically cancels the other. For example, if a user enters one buy order and one sell order as an OCO order, as soon as either the buy or sell order is fulfilled, the other is automatically withdrawn or cancelled. Further, linked orders, in contrast to OCO orders, shall refer to two or more orders that must all be filled in order to fulfill any of them. In other orders, linked orders may not be traded and/or fulfilled separately. They must instead be traded together, as a singular order.

Figure 8B:
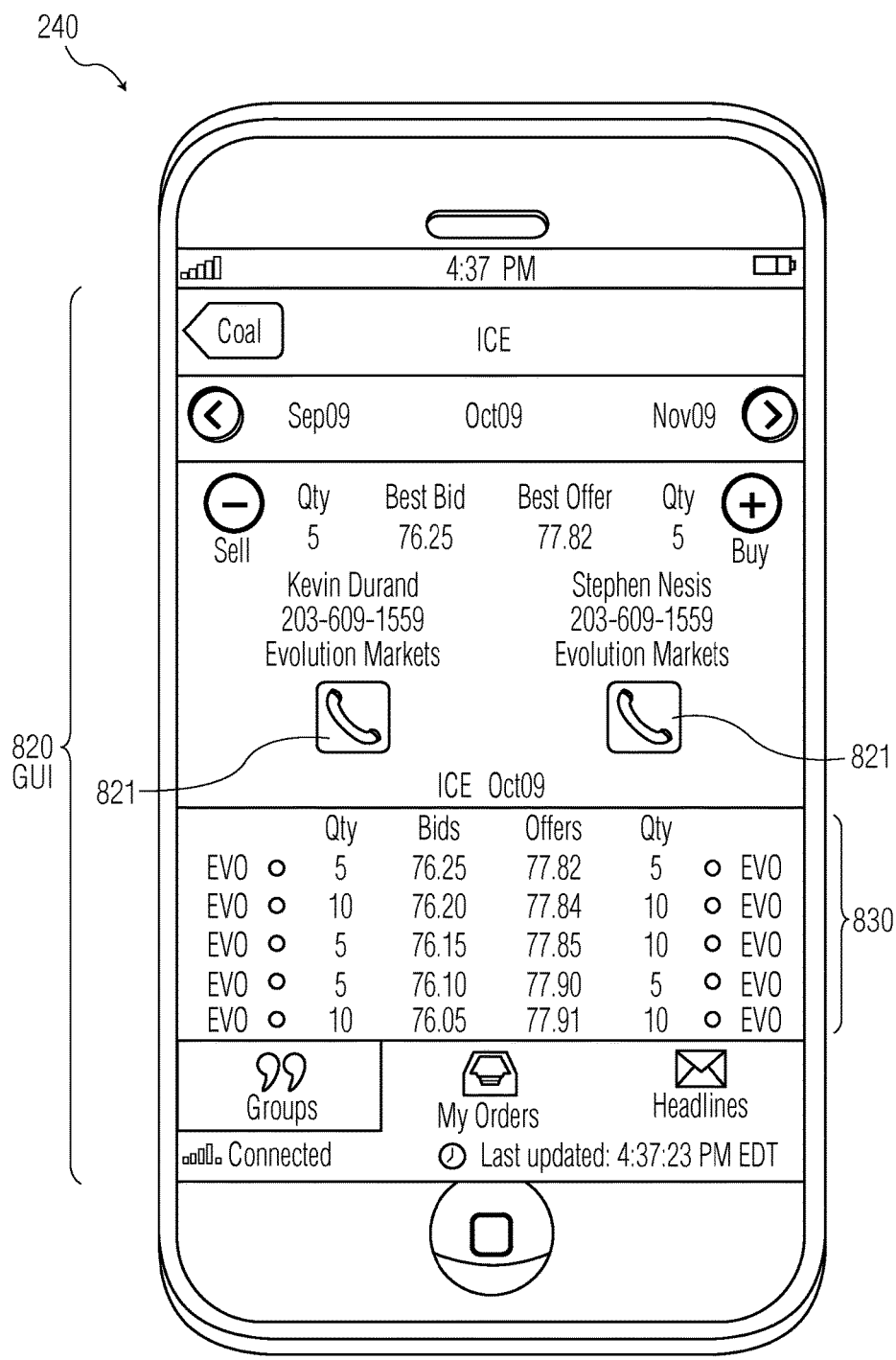

Selection of a particular commodity/trading period combination 811 (e.g., ICE Brent Oct09) causes the OTC GUI 810 to display a full depth of market 830, along with real-time futures prices, for example, associated with the selected commodity/trading period combination, as shown in GUI 820 in FIG. 8B. Notably, the displayed OTC orders are aggregated from various brokers and/or financial exchange systems and displayed in this single OTC GUI 810, a feature that is both novel and extremely advantageous.

In addition to displaying OTC orders, this OTC GUI 810 may also display origin broker, trader, reporter, and/or exchange information relating to the OTC order(s), contact information of the broker(s), trader(s), reporter(s), or back office users posting the OTC order(s), and a call icon 821 associated with one or more of the broker(s), trader(s), reporter(s) and/or back office user(s). This call icon 821, when selected, invokes the communication device 240 to place a telephone call to a selected broker, trader, reporter, back office user, exchange, etc.

In an exemplary implementation, the communication device 240 may further be configured to generate and display an interactive GUI that enables a user to create, retrieve, synthesize, display, monitor, and manage custom spread orders in markets that are derived from different sources. By way of background, a problem frequently encountered by traders involve their need to trade spread orders that are not typically quoted by any single exchange as part of the exchange's order book; and often traders have a need to trade a spread between two different exchanges that would never be provided as part of a single order book. Attempts at manually managing the fills of separate, manually created orders that represent a desired spread (i.e., a custom spread order) have been unsuccessful. Often times, traders will find that one side of the custom spread order has been filled, while the other has not been filled. This may occur, for example, as a result of moving markets, timing of the orders, and fills on the separate orders. In the art, this phenomenon is known as being 'legged' and it results when a trader cannot quickly and cleanly mange the both sides of the spread order as a single unit. As will be appreciated, being 'legged' results in fulfillment of the orders (i.e., positions) being out of sync with what was originally intended, and very often adversely affects on the trader's profit/loss.

In addition to trying to manage custom spread order(s), the trader may also have many other orders working in the market, or other orders requirements to work outright (i.e., conventional orders). Without an efficient manner to view and trade the custom spread orders alongside the conventional markets, the matter can become overwhelming very quickly.

Complicating matters further (with regard to custom spread orders), financial instruments (e.g., contracts) that make up a custom spread order may themselves trade in different units-of-measure, thereby creating the need to perform unit-of-measure and price conversions to properly adjust orders which will facilitate managing both sides of the custom spread order.

Prior to the systems and communication devices described herein, traders were unable to manage the complexities of the custom spread orders, as no mechanism existed that could provides the ability to view and/or manage all of the variable aspects of custom spread orders.

Indeed, using an interactive GUI and a communication device 240 in accordance with the present disclosure enables users to create, retrieve, synthesize, display, monitor, and manage markets that are derived from different commodity sources. These sources may be non-standard spread quotes from a single financial exchange or spread orders comprised of quotes from different financial exchanges. The trading community often has the need to create arbitrage opportunities represented by spread orders and often these specific spread orders are not supported as part of any financial exchange's order book that would allow users to simply view and trade the spread orders as a single contract. By enabling a user to create and manage the custom spread orders composed of contracts of the user's choice, a communication device (e.g., device 240) in accordance with the present disclosure can meet the user's requirements to trade these custom spread orders. Users can view their custom spread markets co-mingled with the quotes of the underlying contracts in a single interactive GUI, or the custom spread markets may be viewed in separate GUIs, depending on the user's particular needs. By representing the custom spread markets in this fashion, users may easily determine the market conditions according to various sources, and ultimately decide whether and how to trade their custom spread orders.

According to the present disclosure, the communication device 240 may generate and display an interactive GUI for creating and managing custom spread orders. This 'custom spread' GUI allows a user to specify and enter several factors that will make up the actual orders that are placed and managed as a custom spread order. For example, the user may specify the two underlying contracts that make up the custom spread order, which may include contracts quoted on a single exchange or contracts quoted on different exchanges. For purposes of this disclosure, the term "contract" may refer to both exchange quoted spread orders and/or simple outright contracts. Notably, if the contracts are from two exchanges, the two exchanges will each have their own order book. As a result, management of the custom spread order can involve working with a single futures exchange or two. In addition, the custom spread GUI enables the user to specify any price and quantity conversions needed to bring the custom spread into balance. These conversions will ensure that the actual orders placed will reflect the desired outcome in terms of the actual number of fills that will be needed to properly fulfill the custom spread order. Users may also specify a particular price for the custom spread order, and adjustment points that are used by a server system according to the present disclosure (e.g., server system 100) to effectively complete (i.e., execute transactions for) the custom spread order. These adjustment points are used by the server system to place additional orders in the event that a first attempt to trade the custom spread order fails. For example, if the server system is unable to trade the custom spread order at the user-specified price, the adjustment points allow the server system to place another order (at a price adjusted by the adjustment points) in an effort to trade the custom spread order.

In addition, the custom spread GUI enables the user to specify the maximum number of units to trade on the orders, and a quantity that represent the maximum imbalance acceptable before the system will stop trading the order. For example, if the custom spread order involved two contracts, the user may specify that each contract is for fifty (50) units. The user may also specify that the maximum imbalance may not exceed five (5) units. This means that the difference between untraded units on the buy side and sell side of the custom spread order will not be permitted to surpass 5 units. This maximum imbalance parameter will prevent the user's spread order from being filled on one side, while the other side of the order under-filled beyond an acceptable threshold.

In terms of trading the custom spread orders, users can specify parameters as to how to manage the orders that will be placed by the server system on the underlying contracts. Again these contracts can be listed on the same financial exchange, or on different exchanges, depending on how each particular user has created the particular custom spread order. Custom spread orders are actually orders on the two underlying contacts and these orders are managed by the server system as a pair, but the orders actually represent separate orders on the exchange or exchanges, depending on the components of the custom spread order. While a user's custom spread order is being processed/fulfilled, the custom spread GUI (in conjunction with a server system) displays a current status of the order(s) and the progress being made with regard to the custom spread order. Users can adjust either 'legs' (i.e., each contract comprising the spread order) of the spread order, should an imbalance occur, by bringing one let or side of the spread order into range of the markets so that the server system can continue to work to fulfill the custom spread order. Users may also decide to cancel imbalances on the custom spread order via the custom spread GUI, in which case cancellation instructions are executed by the server system.

In summary, custom spread trading takes a very complicated and time consuming process and organizes it into a concise process for the client. The bulk of the work for fulfillment of the legs of the custom spread order is offloaded to a server system where the management of the custom spread order, based on the underlying market conditions, can be performed efficiently and effectively. Users are presented with the views of the markets, their orders and the progress of the order fulfillment on the exchange or exchanges and they can react to market conditions as needed to adjust or remove working orders as deemed necessary.

Figure 9:
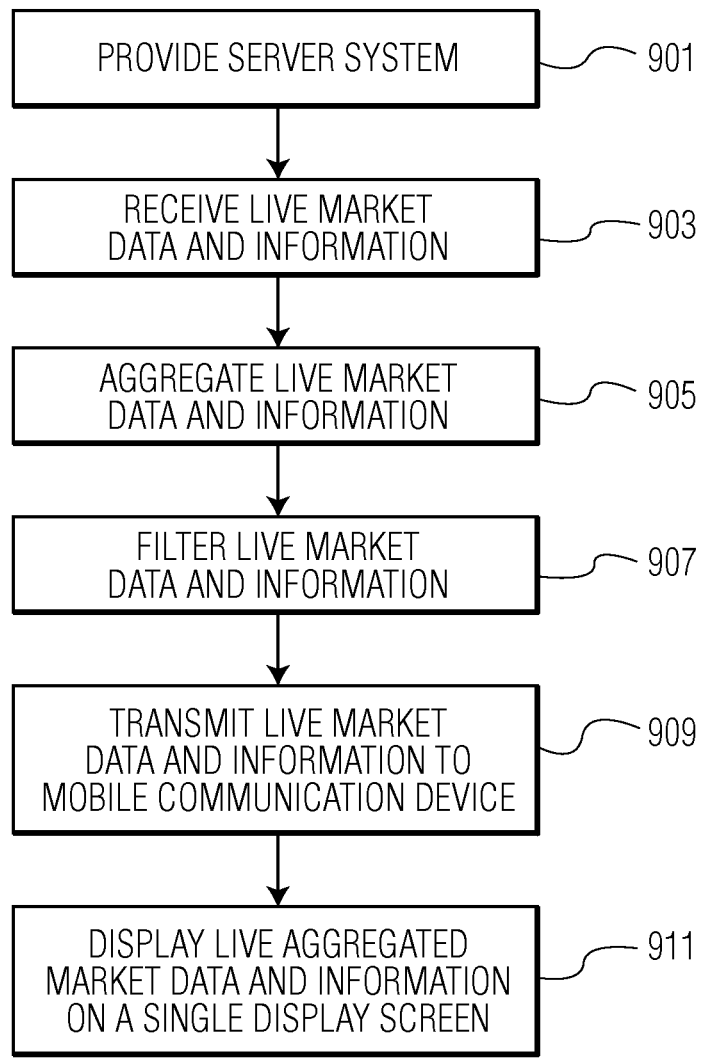
FIG. 9 illustrates an exemplary method in accordance with the present disclosure.

Turning now to FIG. 9, an exemplary method 900 in accordance with the present disclosure is shown. According to the exemplary method 900, a server system comprising one or more computing devices is provided 901. This server system is preferably in communication with one or more financial exchange computers. Next, live market data and information from at least one of the financial exchange computers is received at said server system 903. The server system them aggregates 905 and filters 907 the live market data and information. The aggregated and filtered data and information are then transmitted to one or more mobile communication devices 909. At the one or more mobile communication devices, the aggregated and filtered data and information is simultaneously displayed on a single display screen 911, in real-time, via one or more interactive graphic user interfaces (GUIs).

In an alternate embodiment, the method 900 may further include the step of displaying, via an interactive GUIs, the aggregated live market data and information in the form of a dynamic market window displaying user-selected multi-media content, live market statistics, and at least one execution icon that when selected, invokes the mobile communicating device to generate and transmit a transaction execution command.

In yet another embodiment, the method 900 may include the step of initiating at least transaction execution command via an interactive GUI (displayed by the mobile communication device) by selecting at least one of the execution icons.

In yet another embodiment, the method 900 may include the step of filtering (at the mobile communication device) the live market and information displayed in an interactive GUI according to a user-selected commodity/trading period combination. This filtering step may include subscribing or unsubscribing to one or more live data feeds from the server system.

In yet another embodiment, at least one of the interactive GUIs may include one or more scrolling mechanisms. In such an embodiment, the method 900 may include the step of selecting a commodity/trading period combination by scrolling between one or more trading period icons and one or more commodity selection icons, and then selecting one trading period icon and one commodity selection icon. Selecting these icons may invoke the filtering step described above.

In yet another embodiment, the method 900 may include the step of displaying one of: a live, full depth of market (comprising a listing of bids and offers), a listing of last traded prices, live news, and live price charts in a dynamic market display window in an interactive GUI.

In yet another embodiment, the method 900 may include the step of executing an order directly from a live price chart by: displaying a live price chart having live price points defining a graph, selecting one of the live price points, and then selecting an execution icon (i.e., a buy or sell icon).

In yet another embodiment, the method 900 may include the step of using an interactive GUI to monitor a strength of a communications link between the server system and at least one of said mobile communication devices. If the strength of the communications link falls below a predetermined threshold, the method 900 may include the steps of generating and displaying an alert message, placing open orders on hold until the strength of the communications link rises above the predetermined threshold, and reconnecting the mobile communication device to the server system when the strength of the communications link rises above the predetermined threshold.

In yet another embodiment, the method 900 may include the step of displaying, via an interactive GUI, real-time order data that corresponds to trading activities of one or more users or one or more selected trading accounts. This order data may include open orders, cancelled orders, partially filled orders, and fully filled orders, together with real-time position and profit/loss information. Optionally, the method 900 may further include disabling transaction execution functions for at least one user or selected trading account from an interactive GUI.

In yet another embodiment, the method 900 may further include the step of establishing, via an interactive GUI, one or more pre-set user preferences that imposes trading rules and limits in the mobile communication device. These pre-set user preferences may be stored in the mobile communication device and/or the server system.

In yet another embodiment, the mobile communication device may include a global positioning device. In such an embodiment, the method 900 may further include the step of establishing one or more pre-set user preferences that imposes trading rules and limits according to the geographic location of the mobile communication device.

In yet another embodiment, the method 900 may further include the step of generating and displaying a warning in at least one interactive GUI if a user attempts to execute a transaction (via the mobile communication device), that violates, or comes within a predetermined range of violating, pre-set trading rules and limits. In such am embodiment, a pre-set user preference may be used to prevent the execution of any transactions that violate any pre-set trading rules or limit.

In yet another embodiment, the method 900 may further include the step of linking at least a first mobile communication devices to at least one other mobile communication device such that updates, settings, and transactions executed on the first mobile communication device are automatically reflected on the other mobile communication device, and vice versa.

In yet another embodiment, the method 900 may further include the step of imposing a first set of trading rules and limits on a first of linked mobile communication devices, and imposing a second set of trading rules and limits on a second of linked mobile communication devices. Optionally, these first set and said second sets of rules and limits may be different.

In yet another embodiment, the method 900 may further include the step of entering a security pin code into the mobile communication device (via an interactive GUI) prior to initiating at least one transaction execution command.

In yet another embodiment, the method 900 may further include the step of displaying, via an interactive GUI, headline information that includes information such as: user name information, company name information, account details, news, alerts, new bid and offer information, modifications to bids and offers information, cancellations of bids and offers information, and executed trading transaction information. Optionally, the headline information being displayed may be filtered according to a user profile. As another option, a transaction execution command may be generated and transmitted directly via the GUI in which the headline information is being displayed.

In yet another embodiment, the method 900 may further include the steps of displaying, via an interactive GUI, one or more interactive slide bars configured for adjusting order data details, adjusting (via the interactive slide bars), one or more order data details, and initiating and transmitting a transaction execution command for an order that includes the adjusted data details.

In yet another embodiment, the method 900 may further include the step of simultaneously displaying, via an interactive GUI, a full depth of market of OTC orders together with real-time futures prices associated with a same commodity/trading period combination. Notably, these OTC orders and futures prices may be aggregated from two or more financial exchange computers. In addition to displaying OTC orders (and/or futures prices), the method 900 may optionally include the step of displaying at least one of: an identity of at least one origin entity of at least one OTC order, contact information of the origin entity posting said at least one OTC order, and a call icon that when selected, invokes a telephone call to at least one origin entity. The origin entity may be any of a broker, a trader, a back-office user, a financial exchange, and a reporter. Optionally, the call icon may be selected, thereby placing a telephone call to at least one origin entity. Notably, the OTC orders being displayed may include one or more real orders, implied orders, firm orders, indicative orders, and/or order that have been placed on hold.

In yet another embodiment, the method 900 may further include the step of simultaneously displaying, via an interactive GUI, live bid prices and live offer prices aggregated from two or more financial exchange computers. These aggregated bid prices and offer prices preferably relate to a same commodity type. Optionally, the live bid prices and live offer prices may be displayed according to a price rank, such that higher-ranked prices are displayed ahead of lower-ranked prices (e.g., a listing of prices where best prices are listed at the top of the list) regardless of the financial exchange providing said live price bid or offer.

In yet another embodiment, the method 900 may further include the step of creating, via an interactive GUI, a custom spread order. In such an embodiment, creating the custom spread order may include displaying, via said interactive GUI, a plurality of contracts. These contracts may be provided and posted by one or more financial exchange systems. Two underlying contracts are then selected to make up the custom spread order. These contracts may be selected from one exchange system, or from two different exchange systems. Optionally, one or more order parameters for fulfilling the custom spread order may also be selected. Selectable parameters may include, without limit, price conversion factor(s), quantity conversion factor(s), adjustment point value(s), a maximum imbalance quantity, etc. Once the contracts and parameters are selected, an order execution command that includes the two underlying contracts and the one or more parameters may be transmitted to a server system for fulfillment. At the server system, the custom spread order may be fulfilled according to the one or more parameters. As the order is being fulfilled, the server system may provide, and the interactive GUI may display, a current status and/or an order-fulfillment progress of the custom spread order. If an imbalance is identified, one or both of the two underlying contracts may be adjusted in order resolve the order imbalance. Alternatively, the imbalance may be cancelled.

Although the systems and methods have been described in connection with specific forms thereof, it will be appreciated that a wide variety of equivalents may be substituted for the specified elements described herein without departing from the spirit and scope of this disclosure as described in the appended claims.

The invention claimed is:

1. A system comprising:
a server system comprising one or more computing devices;
one or more financial exchange systems, each comprising one or more exchange computing devices, in communication with the server system;
one or more data source computer devices in communication with the server system; and
one or more mobile communication devices in communication with the server system via at least one communications link,
said server system comprising a memory storing pre-set user preferences and a processor executing software that causes the server system to:
receive live market data and information from at least one of said financial exchange systems and at least one of said data source computer devices,
aggregate said data and information;
filter said data and information according to one or more of said pre-set user preferences; and
transmit the filtered data and information to the one or more mobile communication devices via one or more live data feeds over the at least one communications link,
at least one device of the one or more mobile communication devices comprising a display screen and configured to perform the functions of:
monitoring a strength of the at least one communications link between the server system and the at least one device,
generating and displaying an alert message if the monitored strength falls below a predetermined threshold,
placing open orders received via the at least one device on hold when at least one of the monitored strength falls below the predetermined threshold and the at least one device becomes disconnected from the server system,
reconnecting said at least one device to the server system when the monitored strength rises above said predetermined threshold, and
removing the hold from the open orders when the monitored strength rises above said predetermined threshold.

2. The system of claim 1, wherein the financial exchange systems comprise one or more of a financial exchange platform, a clearing-house platform, and a banking platform.

3. The system of claim 1, wherein the live market data and information comprises at least one of live bids, live offers, a listing of last-traded prices, and live news.

4. The system of claim 3, wherein the server system further comprises software that when executed causes the server system to transmit, in response to one or more mobile communication device commands, information aggregated from one or more of said financial exchange systems, said aggregated information comprising at least one of live market data and information, live multi-media content, live price charts, and live market statistics to said one or more communication devices, said market statistics comprising one or more of a high price, a low price, a best bid price, a best bid offer price, a bid quantity for a given price, an offer quantity for a given price, a settlement price, a last traded price, a transaction status indicator, a total traded volume, a daily price change, a commodity name, a trading period, and an open interest associated with a commodity/trading period combination.

5. The system of claim 1, wherein the server system further comprises software for communicating with said one or more mobile communication devices via an optimized communication scheme that compresses the size of the data streams transmitted from the server system to said mobile communication devices.

6. The system of claim 1, wherein said one or more mobile communication devices comprise at least one of a mobile telephone, a server, a personal computer (PC), a multimedia device, a mobile hand held device, a personal data assistance (PDA), and a combined computing/communication device.

7. The system of claim 1, wherein the pre-set user preferences comprise at least one of trading rules, trading limits, geographic trading rules and limits, and linking preferences for linking one or more of said mobile communication devices together such that changes, updates, settings, and transactions executed via one of said linked devices are automatically reflected on another of said linked devices, and vice versa.

8. The system of claim 1, wherein the server system further comprises software that when executed causes said server system to receive and process at least one of transaction execution commands, buy order commands, sell order commands, data and information filter commands, and subscribing or unsubscribing to one or more of said live data feeds, and commands for setting, canceling, and changing one or more pre-set user preferences.

9. The system of claim 1, wherein the live market data and information relate to one or more commodities selected from the group consisting of coal, crude oil, gas and heat, natural gas, agriculture, metals, and powder.

10. The system of claim 1, wherein the at least one of said mobile communication devices comprises:
   a transmitter configured to transmit data, messages, and commands;
   a receiver configured to receive data transmissions and information from said server system, including via one or more live data feeds;
   one or more input devices for receiving user inputs;
   a display screen; and
   a processor executing software that causes said communication device to generate and display a first interactive graphical user interface (GUI) on said display screen,
   said first interactive GUI simultaneously displaying live market data and information received via at least one of said live data feeds in the form of:
      a dynamic market window displaying user-selected multimedia content,
      live market statistics, and
      at least one execution icon that when selected, invokes said communicating device to generate and transmit a transaction execution command.

11. The system of claim 10, wherein the live market data and information received in the server system comprises data and information aggregated from two or more financial exchange systems, and wherein said first interactive GUI simultaneously displays said aggregated data and information.

12. The system of claim 11, wherein the live market data and information comprises bid prices and offer prices aggregated from two or more financial exchange systems, said aggregated bid prices and offer prices relating to a same commodity type.

13. The system of claim 12, wherein the first interactive GUI is configured to display at least one of the aggregated bid prices and offer prices according to a price rank, wherein higher-ranked prices are displayed ahead of lower-ranked prices.

14. A method comprising:
   providing a server system comprising one or more computing devices, said server system in communication with one or more financial exchange computers and one or more data source computer devices;
   receiving at said server system live market data and information from at least one of said financial exchange computers and at least one of said data source computer devices;
   aggregating said live market data and information;
   filtering said live market data and information; and
   transmitting the aggregated and filtered live market data and information to one or more mobile communication devices in communication with said server system over at least one communications link,
   said one or more mobile communication devices simultaneously displaying, via one or more interactive graphic user interfaces (GUIs), the aggregated and filtered data and information on a single display screen, and
   at least one device of the one or more mobile communication devices:
      monitoring a strength of the at least one communications link between the server system and the at least one device,
      generating and displaying an alert message if the monitored strength falls below a predetermined threshold,
      placing open orders received via the at least one device on hold when at least one of the monitored strength falls below the predetermined threshold and the at least one device becomes disconnected from the server system,
      reconnecting said at least one device to the server system when the monitored strength rises above said predetermined threshold, and
      removing the hold from the open orders when the monitored strength rises above said predetermined threshold.

15. The method of claim 14, further comprising displaying, via a first of said interactive GUIs, the aggregated live market data and information in the form of:
   a dynamic market window displaying user-selected multimedia content,
   live market statistics, and
   at least one execution icon that when selected, invokes said communicating device to generate and transmit a transaction execution command.

16. The method of claim 15, further comprising initiating at least one transaction execution command via said first interactive GUI by selecting at least one of said at least one execution icon.

17. The method of claim 15, further comprising:
   at least one of said mobile communication devices filtering the live market and information displayed via said first interactive GUI according to a user-selected commodity/trading period combination,
   said filtering step comprising subscribing or unsubscribing to one or more live data feeds from the server system.

18. The method of claim 17, wherein at least one of said interactive GUIs comprises one or more scrolling mechanisms, the method further comprising selecting a commodity/trading period combination by:
   scrolling between at least one of trading period icons and commodity selection icons; and
   selecting at least one of said trading period icons and one of the commodity selection icons,
   wherein selecting of at least one of the commodity selection icons and the trading period icons invokes the filtering step.

19. The method of claim 15, further comprising displaying at least one of a live, full depth of market comprising a listing of bids and offers, a listing of last traded prices, live news, and live price charts in said dynamic market window.

20. The method of claim 19, wherein at least one live price chart displayed in the dynamic market window comprises one or more live price points defining a graph, the method further comprising initiating the transaction execution command by:
   selecting one of said live price points; and
   selecting one of said at least one execution icon, thereby invoking the at least one mobile communication device to generate and transmit the transaction execution command for an order at the selected price point.

21. The method of claim 14, further comprising:
   displaying, via at least one of said interactive GUIs, real-time order data that corresponds to trading activities of one or more users or one or more selected trading accounts, said order data comprising open orders, cancelled orders, partially filled orders, and fully filled orders, together with real-time position and profit/loss information; and disabling, via at least one other of said interactive GUIs, transaction execution functions for at least one of said users or said selected trading accounts.

22. The method of claim 14, further comprising:
establishing one or more pre-set user preferences that imposes trading rules and limits in at least one of said mobile communication devices, said pre-set user preferences being stored in at least one of said mobile communication devices and said server system.

23. The method of claim 22, wherein the at least one mobile communication device comprises a global positioning means, the method further comprising:
establishing one or more pre-set user preferences that imposes trading rules and limits according to the geographic location of said at least one mobile communication device.

24. The method of claim 22, further comprising generating and displaying a warning in at least one of said interactive GUIs if a user attempts to execute a transaction, via said at least one mobile communication device, that violates, or comes within a predetermined range of violating, pre-set trading rules and limits, said pre-set user preference preventing the execution of transactions that violates any pre-set trading rules or limit.

25. The method of claim 14, further comprising linking at least a first of said mobile communication devices to at least one other mobile communication devices such that updates, settings, and transactions executed on said first mobile communication device are automatically reflected on said other mobile communication device, and vice versa.

26. The method of claim 25, further comprising imposing a first set of trading rules and limits on said first mobile communication device and imposing a second set of trading rules and limits on said other mobile communication device, wherein said first set and said second set are different.

27. The method of claim 16, further comprising entering a security pin code via said first interactive GUI prior to initiating the at least one transaction execution command.

28. The method of claim 14, further comprising displaying, via at least one of said interactive GUIs, headline information comprising at least one of user name information, company name information, account details, news, alerts, new bid and offer information, modifications to bids and offers information, cancellations of bids and offers information, and executed trading transaction information, said headline information being displayed according to a user profile.

29. The method of claim 28, further comprising generating and transmitting a transaction execution command via the interactive GUI displaying said headline information.

30. The method of claim 14, further comprising:
displaying, via at least one of said interactive GUIs, one or more interactive slide bars configured for adjusting order data details;
adjusting, via said one or more interactive slide bars, one or more order data details; and
initiating and transmitting a transaction execution command for an order comprising said one or more adjusted data details.

31. The method of claim 14, further comprising simultaneously displaying, via at least one of said interactive GUIs, a full depth of market of over-the-counter (OTC) orders together with real-time futures prices associated with a same commodity/trading period combination, said OTC orders and futures prices being aggregated from two or more financial exchange computers.

32. The method of claim 31, further comprising:
displaying, together with said OTC orders, at least one of an identity of at least one origin entity of at least one OTC order, contact information of the origin entity posting said at least one OTC order, and a call icon that when selected, invokes a telephone call to at least one origin entity; and
selecting said call icon, thereby placing a telephone call to said at least one origin entity,
wherein said at least one origin entity comprises at least one of a broker, a trader, a back-office user, a financial exchange, and a reporter.

33. The method of claim 32, wherein the OTC orders comprise at least one of a real order, an implied order, a firm order, an indicative order, an OCO order, a linked order, and an order that has been placed on hold.

34. The method of claim 14, further comprising simultaneously displaying, via at least one of said interactive GUIs, live bid prices and live offer prices aggregated from two or more financial exchange computers, said aggregated bid prices and offer prices relating to a same commodity type.

35. The method of claim 34, further comprising displaying said live bid prices and said live offer prices according to a price rank, wherein higher-ranked prices are displayed ahead of lower-ranked prices.

36. The method of claim 15, wherein the live market statistics comprise one or more of a high price, a low price, a bid quantity for a given price, an offer quantity for a given price, a settlement price, a last traded price, a status indicator, a total traded volume, a daily price change, a commodity name, a trading period, and an open interest associated with a user-selected commodity/trading period combination.

37. The method of claim 14, wherein said mobile communication devices comprise one of a mobile telephone, a server, a personal computer (PC), a multimedia device, a mobile hand held device, a personal data assistance (PDA), and a combined computing/communication device.

38. The method of claim 14, further comprising creating, via at least one of said interactive GUIs, a custom spread order, said creating step comprising:
displaying a plurality of contracts, said contracts being posted by one or more financial exchange systems;
selecting two underlying contracts to make up the custom spread order;
selecting one or more order parameters for fulfilling said custom spread order;
transmitting an order execution command to the server system, said order execution command include the two underlying contracts and the one or more parameters; and
at said server system, fulfilling the custom spread order according to the one or more parameters.

39. The method of claim 38, wherein the underlying contracts are posted by two different financial exchange systems.

40. The method of claim 38, wherein the order parameters includes at least one of a price conversion factor, a quantity conversion factor, an adjustment point value, and a maximum imbalance quantity.

41. The method of claim 38, further comprising:
displaying, via said interactive GUI, a current status and an order-fulfillment progress of the custom spread order,
said current status and order-fulfillment progress being provided by the server system.

42. The method of claim 38, further comprising:
adjusting, via said interactive GUI, at least one of the two underlying contracts in order to resolve an order imbalance.

43. The method of claim 38, further comprising:
cancelling, via said interactive GUI, an imbalance in the spread order reported by the server system.

44. The system of claim 10, wherein at least one of said mobile communication devices comprises software that when executed, causes said mobile communication device to generate and display an interactive custom spread GUI via the display screen,
said custom spread GUI providing means for creating a custom spread order by:
displaying a plurality of contracts, said contracts being posted by one or more financial exchange systems;
receiving input identifying two user-selected underlying contracts to make up the custom spread order;
receiving input identifying one or more user-selected order parameters relating to fulfillment of said custom spread order; and
transmitting an order execution command to the server system, said order execution command include the two selected underlying contracts and the one or more parameters,
wherein said server system is further configured to fulfill the custom spread order received from the at least one mobile communication device according to the one or more parameters.

45. The system of claim 44, wherein the underlying contracts are posted by two different financial exchange systems.

46. The system of claim 44, wherein the order parameters includes at least one of a price conversion factor, a quantity conversion factor, an adjustment point value, and a maximum imbalance quantity.

47. The system of claim 44, wherein the custom spread GUI further displays a current status and an order-fulfillment progress of the custom spread order, said current status and order-fulfillment progress being provided by the server system.

48. The system of claim 44, wherein the custom spread GUI is further configured to:
receive input for adjusting at least one of the two underlying contracts in order to resolve an order imbalance; and
transmit an adjustment command to the server system for adjusting said imbalance,
said server system being configured to adjust the custom spread order in response to said adjustment command.

49. The system of claim 44, wherein the custom spread GUI is further configured to:
receive input for cancelling an imbalance in the spread order; and
transmit a cancellation command to the server system for cancelling said imbalance,
said server system being configured to cancel said imbalance in response to said cancellation command.

50. The system of claim 1, wherein the at least one device is further configured for reconnecting to the server system based on said monitored strength if said at least one device becomes disconnected from said server system.

51. The system of claim 1, wherein the at least one device is further configured for displaying the alert message via the display screen if the monitored strength falls below the predetermined threshold.

* * * * *